United States Patent
Singh et al.

(10) Patent No.: US 11,630,608 B2
(45) Date of Patent: Apr. 18, 2023

(54) VBLOCK METADATA MANAGEMENT

(71) Applicant: NUTANIX, INC., San Jose, CA (US)

(72) Inventors: Kamalneet Singh, Vancouver (CA); Rishi Bhardwaj, San Francisco, CA (US); Karan Gupta, San Jose, CA (US); Vanita Prabhu, Kamataka (IN)

(73) Assignee: NUTANIX, INC., San Jose, CA (US)

( * ) Notice: Subject to any disclaimer, the term of this patent is extended or adjusted under 35 U.S.C. 154(b) by 65 days.

(21) Appl. No.: 17/205,534

(22) Filed: Mar. 18, 2021

(65) Prior Publication Data
US 2022/0188291 A1 Jun. 16, 2022

(30) Foreign Application Priority Data
Dec. 11, 2020 (IN) .............................. 202041054020

(51) Int. Cl.
*G06F 3/06* (2006.01)
*G06F 11/14* (2006.01)
*G06F 16/188* (2019.01)

(52) U.S. Cl.
CPC ............ *G06F 3/0665* (2013.01); *G06F 3/064* (2013.01); *G06F 3/067* (2013.01); *G06F 3/0619* (2013.01); *G06F 3/0673* (2013.01); *G06F 11/1435* (2013.01); *G06F 16/188* (2019.01); *G06F 3/065* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 8,549,518 B1 | 10/2013 | Aron et al. |
| 8,601,473 B1 | 12/2013 | Aron et al. |
| 8,805,788 B2 | 8/2014 | Gross, IV et al. |
| 8,850,130 B1 | 9/2014 | Aron et al. |
| 8,863,124 B1 | 10/2014 | Aron |
| 9,009,106 B1 | 4/2015 | Aron et al. |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Brian R Peugh
(74) *Attorney, Agent, or Firm* — Artegis Law Group, LLP

(57) ABSTRACT

Various embodiments set forth techniques for managing metadata associated with a vblock, In some embodiments, one or more computer-readable media store instructions that, when executed by one or more processors, cause the one or more processors to perform steps including receiving a request to write data to a live vblock, wherein the request to write data is a first write request for the live vblock; accessing a merged metadata record associated with the live vblock, wherein the merged metadata record comprises metadata corresponding to metadata in metadata records for all but a last snapshot included in a set of snapshots having a metadata record; adding metadata associated with the request to write data to a metadata record for the live vblock; merging a metadata record for the last snapshot into the merged metadata record; and updating a first identifier of the merged metadata record to identify the live vblock.

24 Claims, 15 Drawing Sheets

(56) References Cited

U.S. PATENT DOCUMENTS

| | | | |
|---|---|---|---|
| 9,069,708 | B2 | 6/2015 | Gill et al. |
| 9,336,132 | B1 | 5/2016 | Aron et al. |
| 9,652,265 | B1 | 5/2017 | Narayanasamy et al. |
| 9,720,921 | B1* | 8/2017 | Bhattacharyya ...... G06F 9/4806 |
| 9,747,287 | B1 | 8/2017 | Bhardwaj et al. |
| 9,772,866 | B1 | 9/2017 | Aron et al. |
| 10,802,927 | B2 | 10/2020 | Cheng et al. |
| 10,824,589 | B2 | 11/2020 | Jain et al. |
| 2007/0130229 | A1 | 6/2007 | Anglin et al. |
| 2012/0243395 | A1* | 9/2012 | Farey .................. G06F 11/2094 369/84 |
| 2017/0052717 | A1 | 2/2017 | Rawat et al. |
| 2019/0004704 | A1 | 1/2019 | Rathi et al. |
| 2019/0163763 | A1 | 5/2019 | Pandey et al. |
| 2019/0258529 | A1* | 8/2019 | Moldvai ............... G06F 9/5016 |
| 2019/0340374 | A1 | 11/2019 | Gupta et al. |
| 2021/0232345 | A1 | 7/2021 | Corrie et al. |
| 2021/0232683 | A1 | 7/2021 | Mitra et al. |
| 2022/0067111 | A1 | 3/2022 | Diaz et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.
Poitras, Steven. "The Nutanix Bible" (Jun. 20, 2014), from http://stevenpoitras.com/the-nutanix-bible/ (Publication date based on indicated capture date by Archive.org; first publication date unknown); pp. all.
Poitras, Steven. "The Nutanix Bible" (Jan. 7, 2015), from http://stevenpoitras.com/the-nutanix-bible/ (Publication date based on indicated capture date by Archive.org; first publication date unknown); pp. all.
Poitras, Steven. "The Nutanix Bible" (Jun. 9, 2015), from http://stevenpoitras.com/the-nutanix-bible/ (Publication date based on indicated capture date by Archive.org; first publication date unknown); pp. all.
Poitras, Steven. "The Nutanix Bible" (Sep. 4, 2015), from https://nutanixbible.com/; pp. all.
Poitras, Steven. "The Nutanix Bible" (Jan. 12, 2016), from https://nutanixbible.com/; pp. all.
Poitras, Steven. "The Nutanix Bible" (Jun. 9, 2016), from https://nutanixbible.com/; pp. all.
Poitras, Steven. "The Nutanix Bible" (Jan. 3, 2017), from https://nutanixbible.com/; pp. all.
Poitras, Steven. "The Nutanix Bible" (Jun. 8, 2017), from https://nutanixbible.com/; pp. all.
Poitras, Steven. "The Nutanix Bible" (Jan. 3, 2018), from https://nutanixbible.com/; pp. all.
Poitras, Steven. "The Nutanix Bible" (Jun. 25, 2018), from https://nutanixbible.com/; pp. all.
Poitras, Steven. "The Nutanix Bible" (Jan. 8, 2019), from https://nutanixbible.com/; pp. all.
Poitras, Steven. "The Nutanix Bible" (Jul. 25, 2019), from https://nutanixbible.com/; pp. all.
Poitras, Steven. "The Nutanix Bible" (Sep. 17, 2019), from https://nutanixbible.com/; pp. all.
Cano, Ignacio et al. "Curator: Self-Managing Storage for Enterprise Clusters"; University of Washington; published Mar. 2017; pp. al.
Poitras, Steven. "The Nutanix Bible" (Mar. 2, 2020), from https://nutanixbible.com/; pp. all.
Poitras, Steven. "The Nutanix Bible" (Sep. 1, 2020), from https://nutanixbible.com/; pp. all.
Understanding the files that make up a VMware virtual machine https://mginka.wordpress.com/2014/06/27/understanding-the-files-that-make-up-a-vmware-virtual-machine/.
Parallax: Managing Storage for a Million Machines https://www.usenix.org/legacy/events/hotos05/final_papers_backup/warfield/warfield_html/index.html.
Non Final Office Action received for U.S. Appl. No. 17/205,519 dated Aug. 30, 2022, 17 pages.
Final Office Action received for U.S. Appl. No. 17/205,519 dated Feb. 24, 2023, 20 pages.

* cited by examiner

VBLOCK METADATA MANAGEMENT

CROSS-REFERENCE TO RELATED APPLICATION

This application claims priority from India Provisional Application No. 202041054020, titled "VBLOCK METADATA MANAGEMENT," filed on Dec. 11, 2020, the subject matter of which is incorporated by reference herein in its entirety.

TECHNICAL FIELD

The contemplated embodiments relate generally to management of storage in a computing system and, more specifically, to management of virtual block (vblock) metadata.

BACKGROUND

To facilitate the management of a virtual disk or vdisk, a storage system typically divides the vdisk into units called vblocks. As the vdisk and the various vblocks get written to by applications, the storage system updates various metadata to keep track of which regions or extents of each vblock contain data and which regions do not contain data. When the storage system receives a read request for the vdisk, the vblock or vblocks corresponding to the requested data are identified and then the metadata for those vblocks is accessed to properly respond to the request.

To help keep track of how the data stored on a vdisk changes over time and to facilitate rolling back recent write operations, the storage system can use a sequence of snapshots. Each snapshot records what is stored to the vdisk and the vblocks of the vdisk at the time the snapshot is taken and any further writes to the vdisk or the vblocks are made to the live vdisk and vblocks while each of the previous snapshots is left unchanged. For example, when a snapshot is taken, a new blank vdisk and vblocks (e.g., the new live vdisk and vblocks) is created and the data in the vblocks in the previous snapshot as well as the metadata for the previous snapshot becomes immutable. Write operations received after the snapshot is taken are made to the live vdisk and vblocks and the metadata for the live vdisk and vblocks is updated. A read operation uses the metadata for the vdisk and vblock to determine whether the live vdisk and/or one or more previous snapshots contain the requested data and then the data is read from the identified live vdisk and/or snapshots.

Thus, in order to support reads to the vdisk and vblocks as well as to support accessing previous snapshots and/or rolling back the vdisk to a previous snapshot, the storage system maintains not only the metadata for each of the previous snapshots, but also maintains metadata for the live vdisk. As many snapshots are taken, the overhead for querying all of the metadata for the snapshots can often consume extensive processing resources.

Accordingly, there is need for improved techniques for vblock metadata management.

SUMMARY

Various embodiments of the present disclosure set forth one or more non-transitory computer-readable media storing program instructions that, when executed by one or more processors, cause the one or more processors to perform steps for accessing metadata associated with a vblock. The steps include receiving a request for metadata associated with a vblock; accessing a merged metadata record associated with the vblock, where the merged metadata record comprises metadata corresponding to metadata in metadata records for all but a last snapshot or a live vblock having a metadata record, and a first identifier of the last snapshot or the live vblock having a metadata record; and returning the requested metadata based on the metadata in the merged metadata record and metadata in the metadata record identified by the first identifier.

Various embodiments of the present disclosure set forth one or more non-transitory computer-readable media storing program instructions that, when executed by one or more processors, cause the one or more processors to perform steps for processing a write request. The steps include receiving a request to write data to a live vblock, wherein the request to write data is a first write request for the live vblock; accessing a merged metadata record associated with the live vblock, wherein the merged metadata record comprises metadata corresponding to metadata in metadata records for all but a last snapshot included in a set of snapshots having a metadata record; adding metadata associated with the request to write data to a metadata record for the live vblock; merging a metadata record for the last snapshot into the merged metadata record; and updating a first identifier associated with the merged metadata record to identify the live vblock.

Various embodiments of the present disclosure set forth one or more non-transitory computer-readable media storing program instructions that, when executed by one or more processors, cause the one or more processors to perform steps for managing metadata for a vblock. The steps include managing a metadata record for each snapshot of the vblock that has been written to and managing a merged metadata record. The merged metadata record includes metadata corresponding to the metadata in the metadata records for all but a last snapshot or a live vblock having a metadata record, a first identifier of a next to last snapshot having a metadata record, and a second identifier of the last snapshot or the live vblock having a metadata record.

Other embodiments include, without limitation, a system that implements one or more aspects of the disclosed techniques, and methods for performing one or more aspects of the disclosed techniques.

At least one technical advantage of the disclosed techniques relative to the prior art is that the disclosed techniques can manage and access the metadata records for a vblock or a chain of vdisks using fewer queries than previous approaches. Accordingly, operations that require access to metadata records consume less processing resources compared to previous approaches. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Vblock Metadata Management

Figures 1A, 1B:
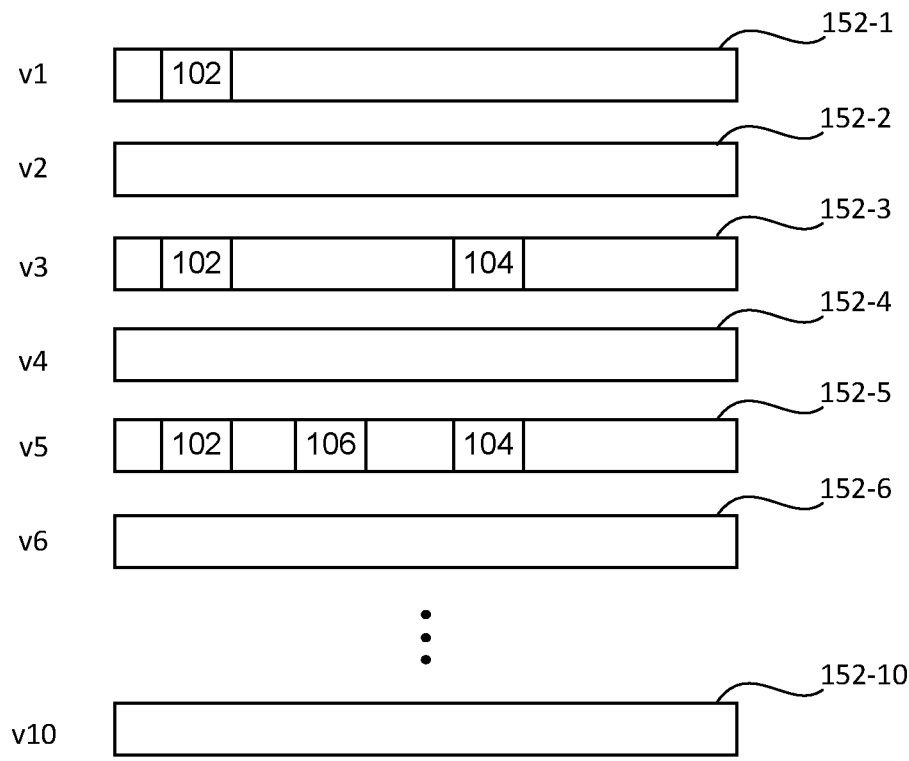
FIG. 1A is a block diagram illustrating vblock metadata records according to various embodiments of the present disclosure.
FIG. 1B is a block diagram illustrating example metadata for data written to a vblock, according to various embodiments of the present disclosure.

FIG. 1A is a block diagram illustrating vblock metadata records according to various embodiments of the present disclosure. As shown in FIG. 1A, the metadata records 152 created for a vblock are shown over a series of nine snapshots (v1-v9) with a metadata record 152-10 corresponding to a live vblock v10 where any additional write operations will write data to the vblock until a new snapshot is taken. In some embodiments, a new snapshot is taken periodically (e.g., hourly) and/or in response to certain events. In more detail, FIG. 1A shows that region 102 was written when snapshot v1 was the live vblock, region 104 was written when snapshot v3 was the live vblock, and region 106 was written when snapshot v5 was the live vblock. No data was written when snapshots v2, v4, and v6-v9 were the live vblock and no data has been written yet to live vblock v10.

Each of the snapshot metadata records 152 in FIG. 1A are cumulative metadata records that record both which regions include data and during which snapshot that region was written. For example, the metadata record 152-1 for snapshot v1 includes information on region 102 and that region 102 can be read from snapshot v1. The metadata record 152-3 for snapshot v3 includes information on region 102 and that region 102 can be read from snapshot v1 and information on region 104 and that region 104 can be read from snapshot v3. Similarly, the metadata record 152-5 for snapshot v5 includes information on regions 102, 104, and 106. In some embodiments, each of the metadata records may be identified or keyed by the corresponding vblock identifier (and/or vdisk chain identifier as described further below) and the snapshot identifier. In some embodiments, a metadata record for a snapshot during which no data was written is null (e.g., empty). When a given snapshot was the live vblock and no data was written to that snapshot while it was the live vblock, that snapshot has no metadata record or the metadata record for that snapshot is null. For example, metadata records 152-2, 152-4, and 152-6 for snapshots v2, v4, and v6, respectively, and also the respective metadata records for snapshots v7-v9, are null (or those snapshots do not have any metadata record). Further, in some embodiments, a metadata record for a given snapshot during which data was written can records zeroes for regions outside of the region(s) in which data was written.

FIG. 1B is a block diagram illustrating example metadata 160 for data written to a vblock, according to various embodiments of the present disclosure. Metadata 160 records metadata for a set of data written to a given region of the vblock during a given snapshot. For example, the metadata record 152-5 can include one set of metadata 160 for the data written to region 102, another set of metadata 160 for the data written to region 104, and a third set of metadata 160 for the data written to region 106. As shown, metadata 160 for a set of written data includes an offset range 162, size 164, snapshot ID 166. In some embodiments, metadata 160 further includes a location map entry reference 168.

In metadata 160, offset range 162 identifies a range of locations (e.g., range of addresses) in the vblock that is occupied by the set of written data. In some embodiments, the offset range 162 can be specified as a starting address in the vblock and an offset number indicating a number of addresses, following the starting address, that are occupied by the set of written data. Size 164 specifies the size of the set of written data. Snapshot identifier (snapshot ID) 166 identifies the snapshot in which the data was written. For example, metadata 160 for data written into region 102 would include a snapshot ID 166 that corresponds to snapshot v1.

In some embodiments, metadata 160 for a set of written data can refer, for translation to one or more locations (e.g., one or more addresses, an address range) in physical storage (e.g., a disk drive, a solid-state drive), to an entry in an address map. The address map provides a layer of address translation between data written into the vblock and a corresponding location in the physical storage. The address map is used for address translation in conjunction with the metadata records, when data is rearranged within the physical storage (e.g., as part of defragmentation of the physical storage), the changed physical addresses can be modified within the address map in lieu of modifying the metadata record. The metadata 160 can include an address map entry reference 168 that refers to an entry in the address map, and the entry in the address map maps the reference to one or more locations in the physical storage. In some embodiments, the address map is an extent identifier (extent ID) map that maps extent IDs to locations in the physical storage, and the address map entry reference is an extent ID (e.g., identifier of an extent associated with the written data).

To facilitate the rapid taking of snapshots and to reduce the storage overhead of the snapshot metadata records, when a new snapshot is created, a metadata record for the new snapshot is not immediately created. Instead, when a first write operation is received for a live vblock, the metadata record for the most recent previous snapshot (or more particularly, the metadata record for the most recent previous snapshot in which data was written or the most recent previous snapshot with a non-null metadata record) is copied and the metadata information for the first write operation is added to the copied metadata record to create the metadata record for the live vblock. Thus, when snapshot v5 was the live vblock, when the write operation corresponding to region 106 was received, a copy of the metadata record 152-3 for snapshot v3 was copied and the information for region 106 was added to the copy to create metadata record 152-5. When a subsequent write operation is received for the live vblock, the metadata record for the live vblock is updated with the metadata for the subsequent write operation.

While this approach to creating and maintaining metadata records reduces the number of metadata records kept for the vblock, it introduces additional overhead. Whenever a read or a write operation is received for a vblock, a search of the metadata records for the vblock is performed to find the most recent snapshot or the live vblock having a metadata record. To find the most recent snapshot or live vblock having a metadata record one or more queries are made to the database or datastore storing the metadata records for the vblock. Because performing these queries serially starting with the live vblock and working back through the previous snapshots can be time consuming, the queries are performed in batches to retrieve the metadata records for the N (e.g., 10) most recent snapshots and the live vblock. When one or more of the queries return a metadata record, the most recent metadata record is used. When none of the queries return a metadata record, another batch of queries for the N next most recent snapshots is performed. This is repeated until the most recent metadata record is found or until a query is performed for all the snapshots. In the latter case, it is known that there have been no write operations to the vblock. This approach is further described below with respect to FIG. 6. One of the drawbacks to this approach is that the batch of metadata queries places a high load on the database or datastore and can increase I/O latency of a read or write operation.

Figure 2A:
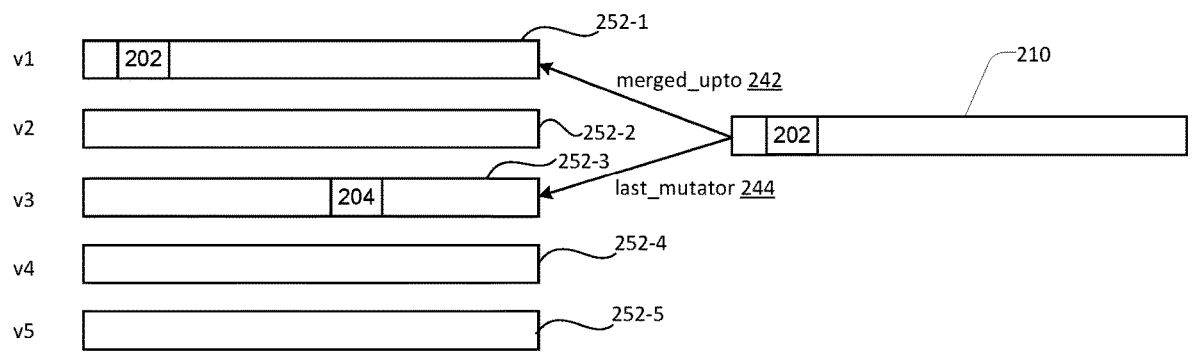
FIGS. 2A, 2B, and 3 are block diagrams illustrating vblock metadata using a merged metadata record according to various embodiments of the present disclosure.
Figure 2B:
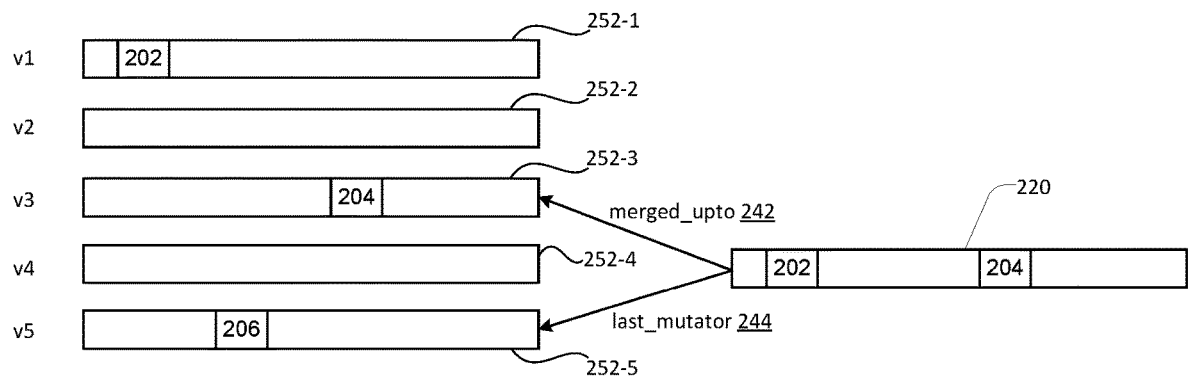
Figure 3:
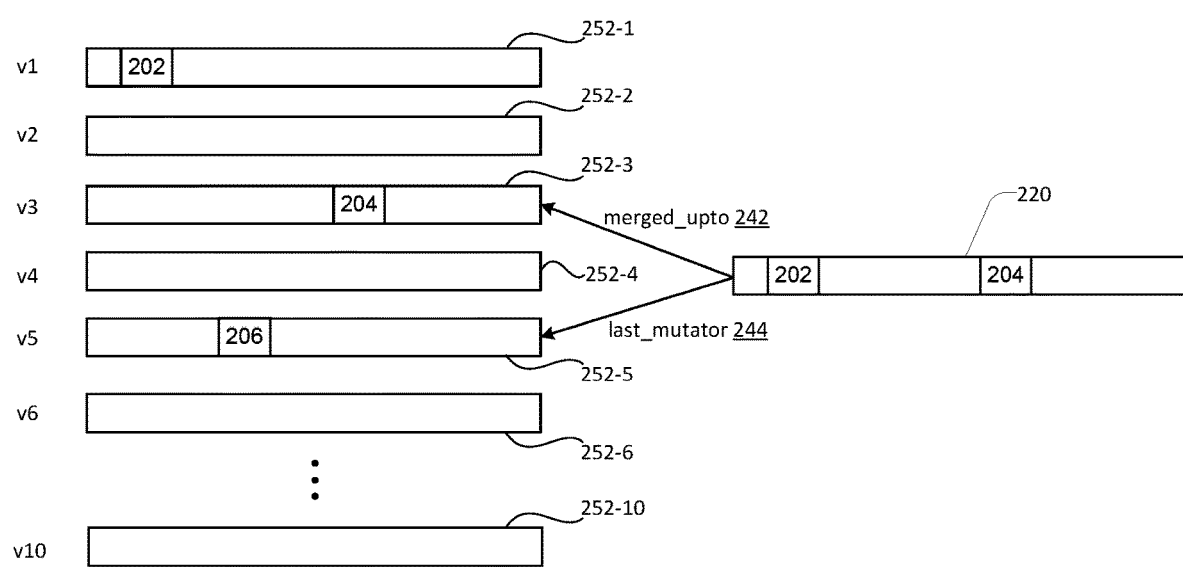

To address the issues of the metadata approach illustrated in FIG. 1A, a merged metadata record can be used. FIGS. 2A, 2B, and 3 are block diagrams illustrating vblock metadata using a merged metadata record according to various embodiments of the present disclosure. FIG. 2A shows the metadata records 252 for a vblock having four previous snapshots (v1-v4) and a live vblock v5. Similar to the approach of FIG. 1A, individual metadata records are maintained for each of the snapshots and the live vblock for which a write operation was received when that snapshot or the live vblock was the live vblock. For example, region 202 was written when snapshot v1 was the live vblock, region 204 was written when snapshot v3 was the live vblock, and no write operations were received when snapshots v2 and v4 were the live vblock and no write operations have yet been received during the live vblock v5. However, unlike the approach of FIG. 1A, the metadata records for snapshots v1 and v3 are not cumulative, but in alternate embodiments these metadata records could be cumulative. In some embodiments, each of the metadata records for snapshots v1 and v3 may be identified or keyed by the corresponding vblock identifier (and/or vdisk chain identifier as described further below) and the snapshot number.

FIG. 2A additionally shows a new merged metadata record 210 for the vblock. Similar to the metadata records from the approach of FIG. 1A, merged metadata record 210 includes a record of each region of the vblock that has been written to and the identifier of the snapshot that was the live vblock when the corresponding write operation for the region was received. However, merged metadata record 210 is cumulative up to the next to most recent snapshot in which a write operation was received. Merged metadata record 210 further includes a merged_upto pointer 242 or other identifier of the snapshot through which the metadata in merged metadata record 210 is cumulative. Merged metadata record 210 further includes a separate last_mutator pointer 244 or identifier of the most recent snapshot or live vblock for which a write operation was received. Thus, merged metadata record 210 includes metadata for the vblock through snapshot v1, a merged_upto pointer 242 to snapshot v1 (or more particularly, to metadata record 252-1 for snapshot v1), and a last_mutator pointer 244 to snapshot v3 (or more particularly, to metadata record 252-3 for snapshot v3). In some embodiments, merged metadata record 210 may be identified or keyed by the corresponding vblock identifier (and/or vdisk chain identifier as described further below).

FIG. 2B shows how the metadata records 252 for a vblock are changed when a first write operation is received while snapshot v5 is the live vblock. As shown in FIG. 2B, a write operation for region 206 has been received. Because this is the first write operation for live vblock v5, live vblock v5 becomes the most recent snapshot or live vblock in which a write operation was received. When this first write operation for live vblock v5 is received, the storage system updates the metadata records 252 by creating a new metadata record 252-5 for live vblock v5 and updating merged metadata record 210 to form merged metadata record 220. The metadata record for live vblock v5 is updated to include the metadata for region 206. Merged metadata record 220 includes a merging of the last_mutator metadata record 252-3 for snapshot v3 and the metadata recorded in merged metadata record 210. Thus, merged metadata record 220 includes the metadata for both regions 202 and 204. The merged_upto pointer 242 of merged metadata record 220 is then set to point to snapshot v3 or to the metadata record 252-3 for snapshot v3 (e.g., the last_mutator pointer 244 of merged metadata record 210) and the last_mutator pointer 244 is updated to point to the live vblock v5 or to the metadata record 252-5 for the live vblock v5. If a subsequent write operation is received while live vblock v5 is the live vblock, the metadata record 252-5 for live vblock v5 is updated accordingly.

FIG. 3 shows the metadata records 252 for the vblock when snapshot v10 has become the live vblock. When a read operation is performed on the vblock or a write operation is received for the vblock, the storage system queries the database or datastore for the merged metadata record for the vblock (e.g., merged metadata record 220). The database or datastore is then queried for the metadata record 252-5 corresponding to snapshot v5 as identified by the last_mutator pointer 244 in merged metadata record 220. The metadata in the metadata record 252-5 for the live vblock v5 and the merged metadata in merged metadata record 220 can then be used to respond to the read operation or update the metadata records 252 as described above with the respect to FIG. 2B. Thus, the metadata for the vblock can be determined using two queries: one for merged metadata record 220 and one for the last_mutator metadata record 252-5 for live vblock v5. In some examples, where no merged metadata record is found for the vblock, the metadata for the vblock can be accessed using an approach similar to the approach described with respect to FIGS. 1A and 6.

In some embodiments, in the merged metadata record 220 and the metadata records 252, the metadata for a set of written data is similar in content to metadata 160 as shown in FIG. 1B. Further, in some embodiments, in the metadata for a set of written data in the merged metadata record, the address map entry reference 168 can be replaced by the corresponding location(s) in the physical storage, thus facilitating bypassing of the address map for address translation into the physical storage. The metadata 160 for the same set of written data in the snapshot metadata record can still include the address map entry reference 168.

Vblock Metadata Management Using Vblock Chains

Figure 4A:
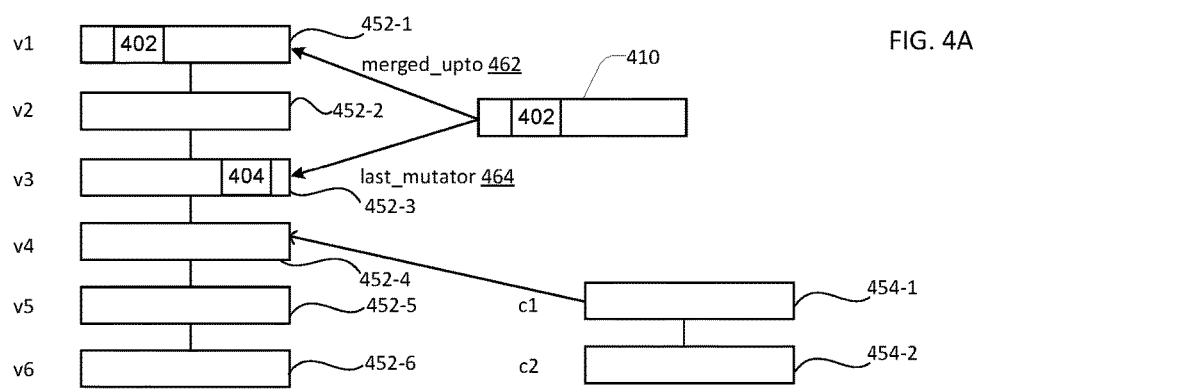
FIGS. 4A-4D are block diagrams illustrating vblock metadata for vdisk chains according to various embodiments of the present disclosure.

To facilitate the cloning of vdisks and vblocks, additional metadata can be used. FIGS. 4A-4D are block diagrams illustrating vblock metadata for snapshot chains according to various embodiments of the present disclosure. As shown in FIG. 4A, a vblock for a first vdisk includes a chain of snapshots v1-v5 and a live vblock v6, which may be identified by a first unique vdisk chain identifier for the first vdisk. When the snapshot was taken that made snapshot v5 the live vblock, a clone of the first vdisk was created and is represented by a cloned vblock for a second cloned vdisk with snapshot c1 and live vblock c2, which may be identified by a second unique vdisk chain identifier. When the first vdisk is cloned to create the cloned second vdisk, metadata linking the first vdisk as a parent to the second cloned vdisk is recorded as indicated by the arrow linking the snapshot c1 to snapshot v4.

The metadata records 452 for the depicted vblock of the first vdisk include a metadata record 452-1 for snapshot v1 with metadata for region 402, a metadata record 452-3 for snapshot v3 with metadata for region 404, and a merged metadata record 410 with merged metadata through merged_upto snapshot v1, as indicated by merged_upto pointer 462, and a last_mutator pointer 464 to snapshot v3. In some embodiments, each of the metadata records for snapshots v1 and v3 may be identified or keyed by the corresponding vdisk chain identifier for the vblock, an identifier for the vblock, and/or the snapshot number. In some embodiments merged metadata record 410 may be identified or keyed by the vdisk chain identifier for the vblock and/or an identifier for the vblock. Metadata records 454 for the second cloned vdisk can include the metadata linking the first vdisk as a parent to the second cloned vdisk described above.

Rather than making a copy of merged metadata record 410 when the first vdisk was cloned as the cloned second vdisk, merged metadata record 410 can be used for the vblock in both the first vdisk and the cloned second vdisk. Thus, when a query for the merged metadata record for the vblock of the cloned second vdisk does not return a record, the metadata linking the cloned second vdisk to the first vdisk may be used to generate a query for merged metadata record 410 for the vblock in the first vdisk. This process can be repeated for the parent of the first vdisk until a merged metadata record is found or, when no merged metadata record is found for the last parent, then the approach for accessing metadata as described with respect to FIGS. 1A and 6 can be used.

Figure 4B:
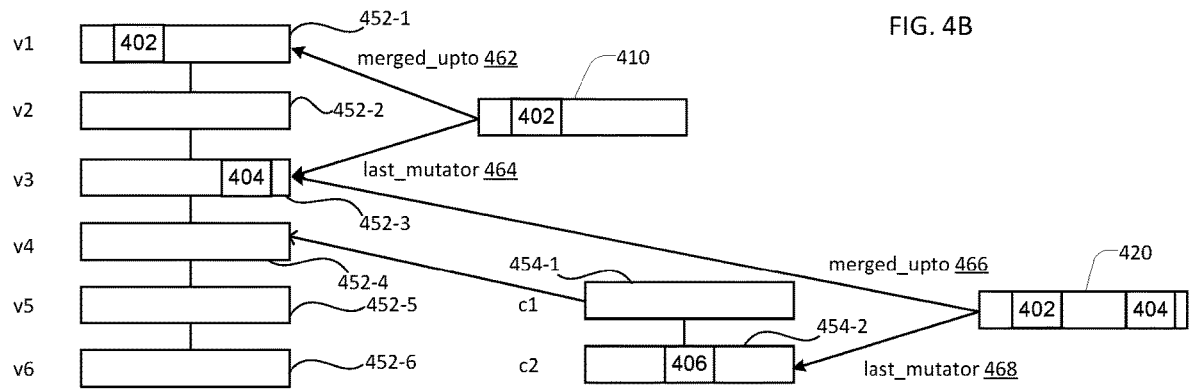

FIG. 4B shows how the metadata records for the vblock of the cloned second vdisk are changed when a first write operation is received for the vblock in the cloned second vdisk. As shown in FIG. 4B, when a write operation is received for the vblock in the cloned second vdisk while c2 is the live vblock, a merged metadata record 420 for the vblock in the cloned second vdisk is created. Merged metadata record 420 includes the merged metadata from merged metadata record 410 as well as the metadata from the metadata record for snapshot v3 (e.g., as identified by the last_mutator pointer 464 of merged metadata record 410). Merged metadata record 420 further includes a merged_upto pointer 466 to snapshot v3 and a last_mutator pointer 468 to live vblock c2. A metadata record 454-2 for live vblock c2 is also created with the metadata for region 406. Metadata for additional write operations received while live vblock c2 is the live vblock for the vblock in the cloned second vdisk are recorded in the metadata record 454-2 for live vblock c2.

Figure 4C:
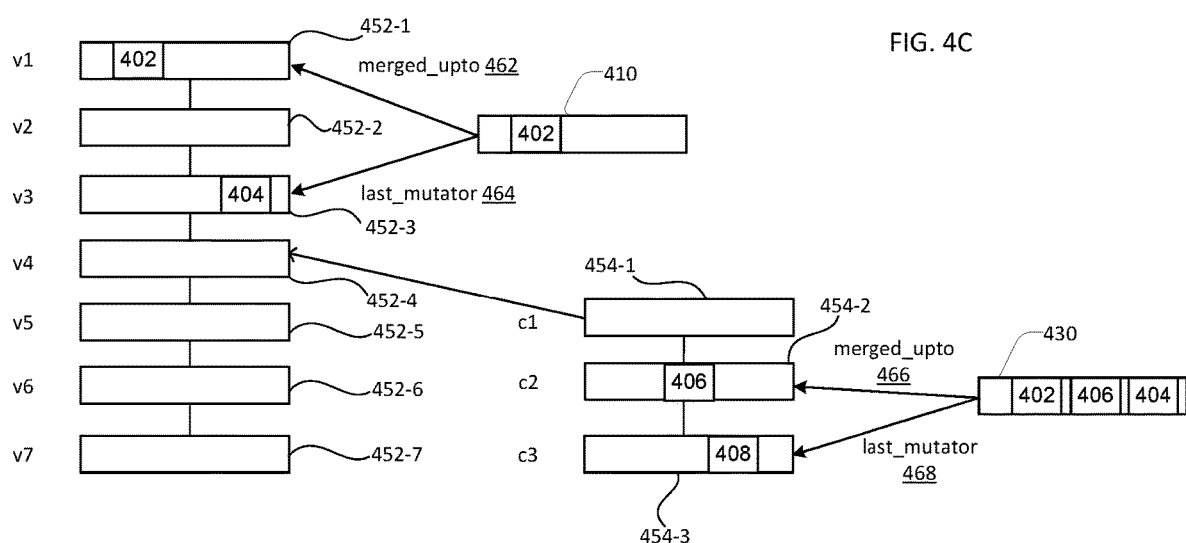

FIG. 4C shows how the metadata records for the vblock of the cloned second vdisk are changed when a first write operation is received for a second live vblock for the vblock in the cloned second vdisk that has received a write operation. As shown in FIG. 4C, upon receiving a write operation for region 408, a metadata record 454-3 for live vblock c3 is created and the metadata for region 408 is added to the metadata record 454-3 for live vblock c3. Merged metadata record 420 is updated to become a merged metadata record 430. Merged metadata record 430 includes a merging of the metadata from the metadata record 454-2 for snapshot c2 (e.g., the last_mutator 468 of merged metadata record 420) and the metadata in merged metadata record 420. The merged_upto pointer 466 of merged metadata record 430 points to snapshot c2 and the last_mutator pointer 468 of merged metadata record 430 points to the metadata record 454-3 for live vblock c3.

Figure 4D:
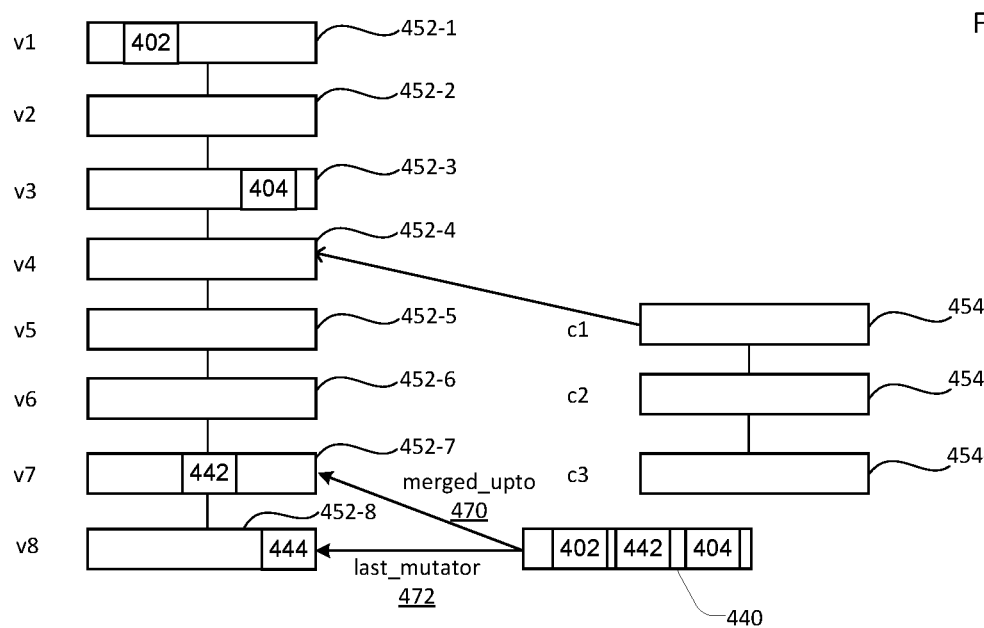

FIG. 4D shows how the metadata records for the vblock for both the first vdisk and the cloned second vdisk are changed when multiple write operations are received for the vblock in the first vdisk before a write operation is received for the vblock in the cloned second vblock. As shown in FIG. 4D, write operations have been received for region 442 in snapshot v7 of the vblock of the first vdisk and for region 444 in live vblock v8 of the first vdisk. As a result, metadata records 452-7 and 452-8 for snapshot v7 and live vblock v8 have been created recording the metadata for regions 442 and 444, respectively. Additionally, the merged metadata record 440 for the first vblock includes the metadata merged up through snapshot v7, a merged_upto pointer 470 to snapshot v7, and a last_mutator pointer 472 to live vblock v8. As a side effect of these changes to the metadata records, no merged metadata record will be found for the vblock of the cloned second vdisk and merged metadata record 440 is not suitable as a merged metadata record for use with the vblock of the cloned second vdisk. In this situation, the approach described with respect to FIGS. 1A and 6 can be used to obtain the metadata for the vblock of the cloned second vblock.

As described above, the metadata (e.g., metadata 160) in each of the metadata records and merged metadata records of FIGS. 1A-4D include metadata on the regions of the vblock that have been written to. This metadata includes information on where in the vblock the regions are located. In some examples, this location information (e.g., offset range 162) can include a range of storage blocks, a range of offsets within the vblock, a range of virtual addresses, and/or the like. In some embodiments, the location information can additionally and/or alternatively include physical address information (e.g., a reference to a location in physical storage in lieu of an address map entry reference 168) identifying where the region is stored in a physical storage device. Including this physical address information in the metadata record eliminates the need for an address translation of the location information (e.g., via address map entry reference 168) after retrieving it from the metadata record or the merged metadata record.

In some embodiments, the metadata records and/or the merged metadata records may be updated by other operations other than write operations. In some examples, the metadata records and/or the merged metadata records can be updated by tasks such as deduplication, vblock copies, compression, defragmentation, and/or the like.

Figure 5:
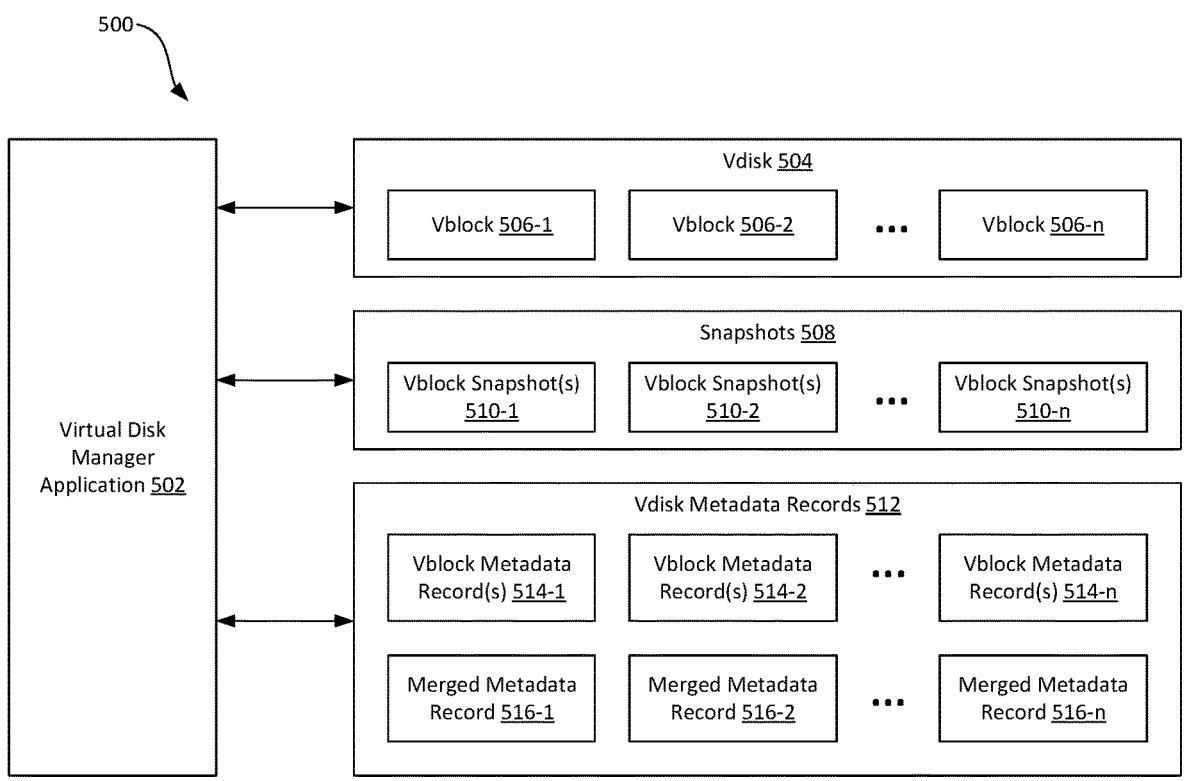
FIG. 5 is a block diagram illustrating an example virtual disk management system using merged metadata records, according to various embodiments of the present disclosure.

FIG. 5 is a block diagram illustrating an example virtual disk management system using merged metadata records, according to various embodiments of the present disclosure. A virtual disk management system 500 can include a virtual disk manager application 502 managing a virtual disk (vdisk) 504. Virtual disk management system 500 can be implemented via software, hardware, and/or a combination of software hardware. Vdisk 504 can be divided into multiple virtual blocks (vblocks) 506-1 thru 506-n. In some embodiments, vdisk 504 or one or more portions thereof (e.g., a range of vblocks 506) can be cloned.

Virtual disk manager application 502 can take snapshots 508 of vdisk 504 periodically and/or in response to certain events. In particular, for a given vblock, virtual disk manager application 502 can take one or more snapshots, similar to snapshots v1 thru v10 for a vblock as described above with respect to FIG. 1A. Snapshots 508 include one or more vblock snapshots 510-1 for vblock 506-1, one or more vblock snapshots 510-2 for vblock 506-2, and one or more vblock snapshots 510-n for vblock 506-n. In some embodiments, snapshots for a vblock can include one or more chains of snapshots for the vblock. For example, vblock snapshots 510-1 can include one or more chains of snapshots of the vblock, which may include a parent chain and a clone chain that can reference a portion of the parent chain.

Virtual disk manager application 502 also can generate and manage vdisk metadata records 512 (e.g., metadata records 152, 252, 452, and/or 454). Vdisk metadata records 512 record metadata for data written into the vdisk at various points in time and as captured in various snapshots 508. Vdisk metadata records 512 include sets of metadata records for vblocks 506. Vblock metadata records 514-1 include metadata records for vblock 506-1 and vblock snapshots 510-1, vblock metadata records 514-2 include metadata records for vblock 506-2 and vblock snapshots 510-2, and vblock metadata records 514-n include metadata records for vblock 506-n and vblock snapshots 510-n. For example, vblock metadata record 514-1 can include one or more metadata records 152 for vblock 506-1 and snapshots 510-1 thereof. In some embodiments, vdisk metadata records 512 are stored in a persistent storage (e.g., a disk drive or solid-state drive database accessible by virtual disk manager application 502). In some embodiments, vdisk metadata records 512 are stored in a database.

Vdisk metadata records 512 further include merged metadata records 516 (e.g., merged metadata records 210, 220, 410, 420, 430, and/or 440) for vblocks 506. In particular, vdisk metadata records 512 can include a merged metadata record 516-1 for vblock 506-1, a merged metadata record 516-2 for vblock 506-2, and a merged metadata record 516-n for vblock 506-n. As described above, a merged metadata record 516 for a vblock 506 can include a merged_upto pointer and a last_mutator pointer, as described above. For example, merged metadata record 516-1 can include a merged_upto pointer referencing the vblock metadata record amongst metadata records 514-1 up to which the merged metadata record 516 has accumulated metadata, and a last_mutator pointer referencing a metadata record amongst metadata records 514-1 that includes metadata for the version of the vblock 506-1 most recently written to with data, which may be the live vblock 506-1 or the last snapshot 510-1 with written data.

In some embodiments, metadata records 512 can include address map entry references 168, and merged metadata records 516 can include references to locations in physical storage.

Figure 6:
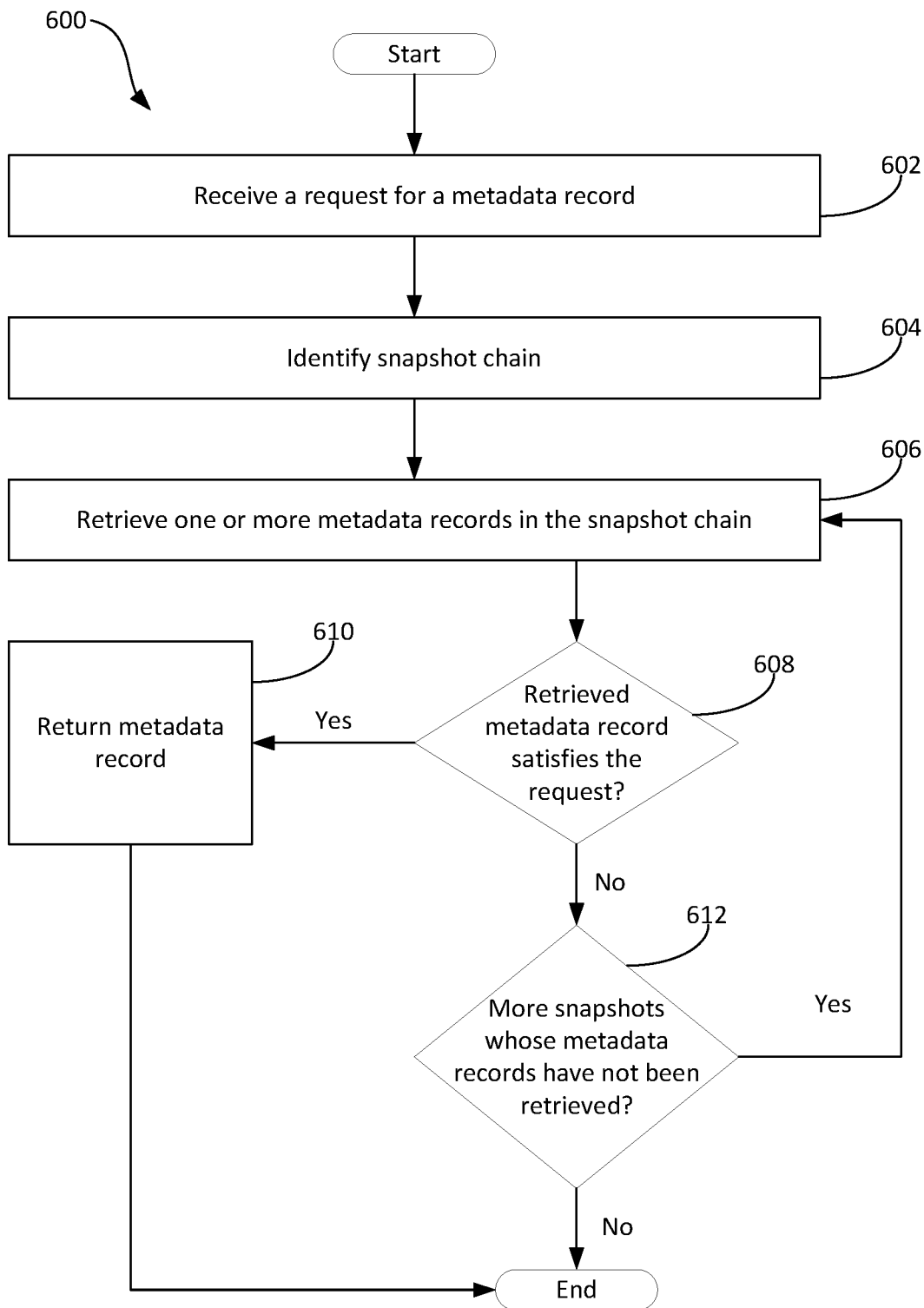
FIG. 6 is a flow diagram of method steps for querying for a metadata record, according to various embodiments of the present disclosure.

FIG. 6 is a flow diagram of method steps for querying for a metadata record, according to various embodiments of the present disclosure. In some embodiments, the method steps of FIG. 6 may be performed by any computing device or system implementing a virtual disk, such as any of the computing systems disclosed in FIGS. 1A-5 and 9A-10 disclosed herein.

As shown in FIG. 6, a method 600 begins at a step 602 where a virtual disk manager application 502 receives a request for a metadata record. A read operation or a write operation can require access to a metadata record and/or certain metadata in the metadata record, for completion, and accordingly, a request for a metadata record can be made in furtherance of the read or write operation. In some embodiments, the request may be a request for metadata associated with certain data required for the read or write request. The request can specify one or more vblock locations (e.g., an offset range) associated with the read or write operation.

At step 604, the virtual disk manager application 502 identifies a chain of snapshots responsive to the request. The virtual disk manager application 502 can, for example, identify the vblock, and a corresponding snapshot chain, that meets the request. For example, for a metadata record request based on a read operation, the virtual disk manager application 502 identifies the vblock and a corresponding snapshot chain associated with the read operation.

At step 606, the virtual disk manager application 502 retrieves one or more metadata records in the identified snapshot chain. At the first iteration of step 606, the virtual disk manager application 502 retrieves the metadata record(s) for the most recent one or more snapshots in the snapshot chain. In some embodiments, this includes determining whether the latest snapshot for the vblock, which may be the live vblock or the most recent snapshot for the vblock, has an associated metadata record. The result of the retrieval may be the metadata record or null. In some embodiments, metadata records can be retrieved in batches of multiple metadata records. For example, the virtual disk manager application 502 can attempt to retrieve a batch of up to 10 metadata records (e.g., metadata records for up to 10 snapshots including snapshots that do not have an associated metadata record or whose metadata record is null) at a time.

At step 608, the virtual disk manager application 502 determines whether the retrieved metadata record satisfies the request. If the retrieved metadata record satisfies the request (e.g., the metadata record includes the metadata responsive to the request), then method 600 proceeds (608—Yes) to step 610, where the virtual disk manager application 502 returns the metadata record. In some embodiments, the virtual disk manager application 502 can retrieve the metadata responsive to the request from the metadata record and return the metadata. Then method 600 ends.

If the retrieved metadata record does not satisfy the request (e.g., the retrieved metadata record is null, no metadata record is retrieved for a snapshot because the snapshot does not have a metadata record, or the retrieved metadata record does not include the metadata responsive to the request,) then method 600 proceeds (608—No) to step 612, where the virtual disk manager application 502 can attempt to retrieve another metadata record if there are additional snapshots whose metadata records have not been requested yet for retrieval. If there are no more snapshots whose metadata records have not been requested, then the virtual disk manager application 502 does not attempt to retrieve another metadata record and the method 600 (612—No) ends. The virtual disk manager application 502 can return a message or other information indicating that the data is not found in for the vblock location (e.g., an offset range) specified in the request (e.g., return zeroes), in accordance with the failure to retrieve a metadata record that satisfies the request.

If there are more snapshots whose metadata records have not been requested, then the virtual disk manager application 502 proceeds to attempt retrieving another metadata record and the method 600 proceeds (612—Yes) back to step 606, where the virtual disk manager application 502 can retrieve one or more other metadata records for the next most recent one or more snapshots.

Figure 7:
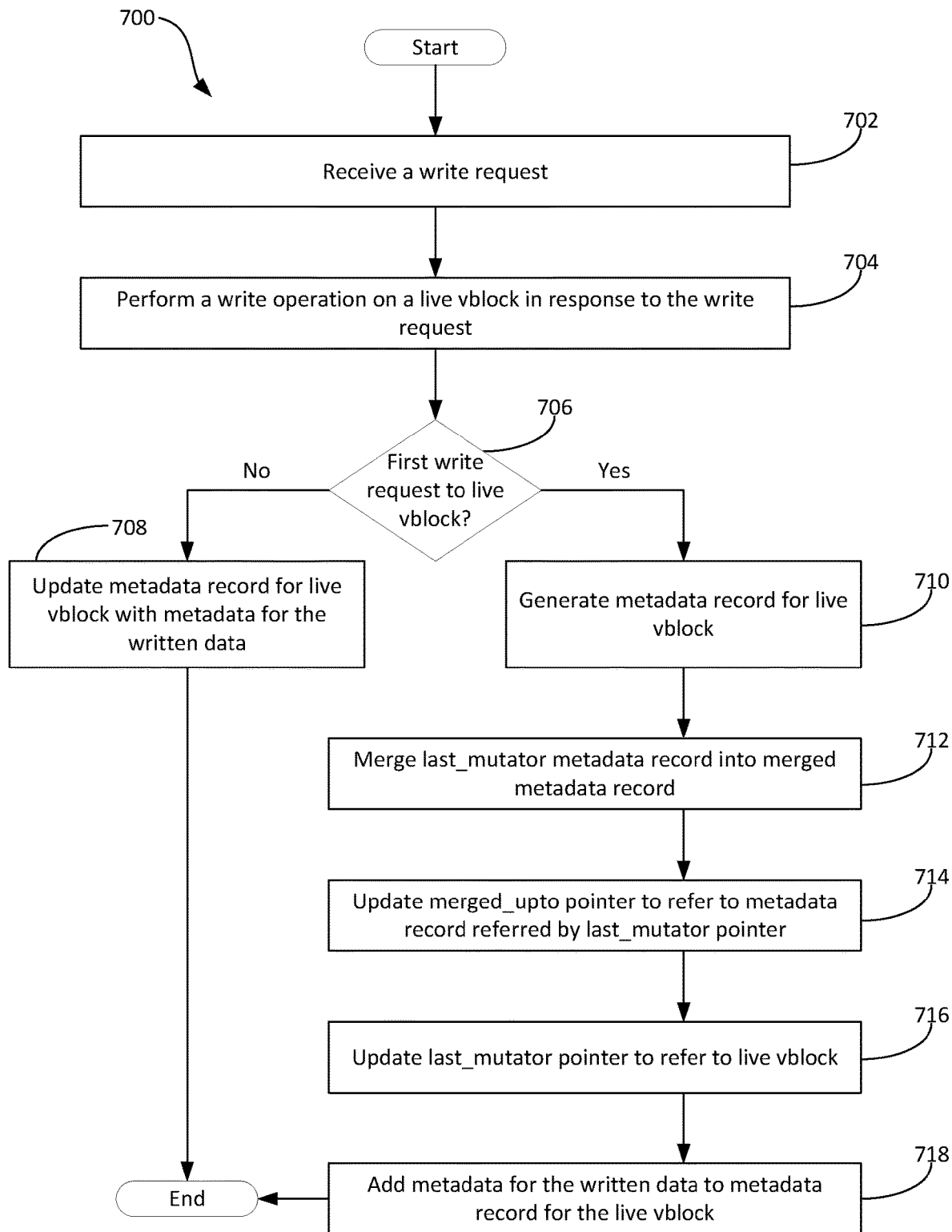
FIG. 7 is a flow diagram of method steps for performing a write operation using a merged metadata record, according to various embodiments of the present disclosure.

FIG. 7 is a flow diagram of method steps for performing a write operation using a merged metadata record, according to various embodiments of the present disclosure. In some embodiments, the method steps of FIG. 7 may be performed by any computing device or system implementing a virtual disk, such as any of the computing systems disclosed in FIGS. 1A-5 and 9A-10 disclosed herein.

As shown in FIG. 7, a method 700 begins at a step 702 where a virtual disk manager application 502 receives a write request. The virtual disk manager application 502 can receive a write request (e.g., from an application) to write a set of data to the vdisk.

At step 704, the virtual disk manager application 502 performs a write operation on a live vblock in response to the write request. The virtual disk manager application 502 fulfills the write request by writing data into the live vblock of the vdisk.

At step 706, the virtual disk manager application 502 determines whether the write request is the first write request to the live vblock. The virtual disk manager application 502 determines whether the data written to the vblock by the write operation is the first write to the live vblock (e.g., since the most recent snapshot was taken). For multiple vblocks to which data was written in response to the write request, the virtual disk manager application 502 can make this determination for each of the vblocks individually.

If the write request is not the first write request to the live vblock, then method 700 proceeds to step 708, where the virtual disk manager application 502 updates the metadata record for the live vblock with metadata for the written data. The virtual disk manager application 502 retrieves the metadata record for the live vblock and adds to or updates the metadata for the written data to that metadata record. Method 700 then ends.

If the write request is the first write request to the live vblock, then method 700 proceeds to step 710, where the virtual disk manager application 502 generates a metadata record for the live vblock. For example, as shown in FIGS. 2A-2B, data written to region 206 in live vblock v5 is the first data written into live vblock v5. Accordingly, the virtual disk manager application 502 can generate a metadata record 252-5 for live vblock v5.

At step 712, the virtual disk manager application 502 merges the metadata record pointed to by the last_mutator pointer into the merged metadata record. The virtual disk manager application 502 retrieves the metadata record pointed to by the last_mutator pointer and adds the metadata in that metadata record into the merged metadata record. Further continuing with the example of FIGS. 2A-2B, the metadata record 252-3, referenced by the last_mutator pointer 244, is merged into metadata record 210 to form merged metadata record 220. As shown in FIG. 2B, merged metadata record 220 includes metadata associated with written region 202, from merged metadata record 210, and metadata associated with written region 204, from metadata record 252-3.

At step 714, the virtual disk manager application 502 updates the merged_upto pointer to refer to the metadata record referred by the last_mutator pointer. The virtual disk manager application 502 updates the merged_upto pointer to reflect that the merged metadata record has further accumulated metadata records up to the snapshot associated with the last_mutator. Further continuing with the example of FIGS. 2A-2B, the merged_upto pointer 242 is updated to point to metadata record 252-3 for snapshot v3, to which the last_mutator pointer 244 is pointing.

At step 716, the virtual disk manager application 502 updates the last_mutator pointer to refer to the live vblock. The virtual disk manager application 502 updates the last_mutator pointer to reflect that the most recently written-to snapshot is now the live vblock. Further continuing with the example of FIGS. 2A-2B, the last_mutator pointer 244 is updated to point to metadata record 252-5 for live vblock v5.

At step 718, the virtual disk manager application 502 adds metadata for the written data to the metadata record for the live vblock. The virtual disk manager application 502 adds metadata (e.g., metadata 160) for the data written into the vblock to the metadata record for the vblock, in particular the metadata record generated in step 710 above. Continuing with the example of FIGS. 2A-2B, the virtual disk manager application 502 adds the metadata for the data written to region 206 into newly generated metadata record 252-5.

Figure 8:
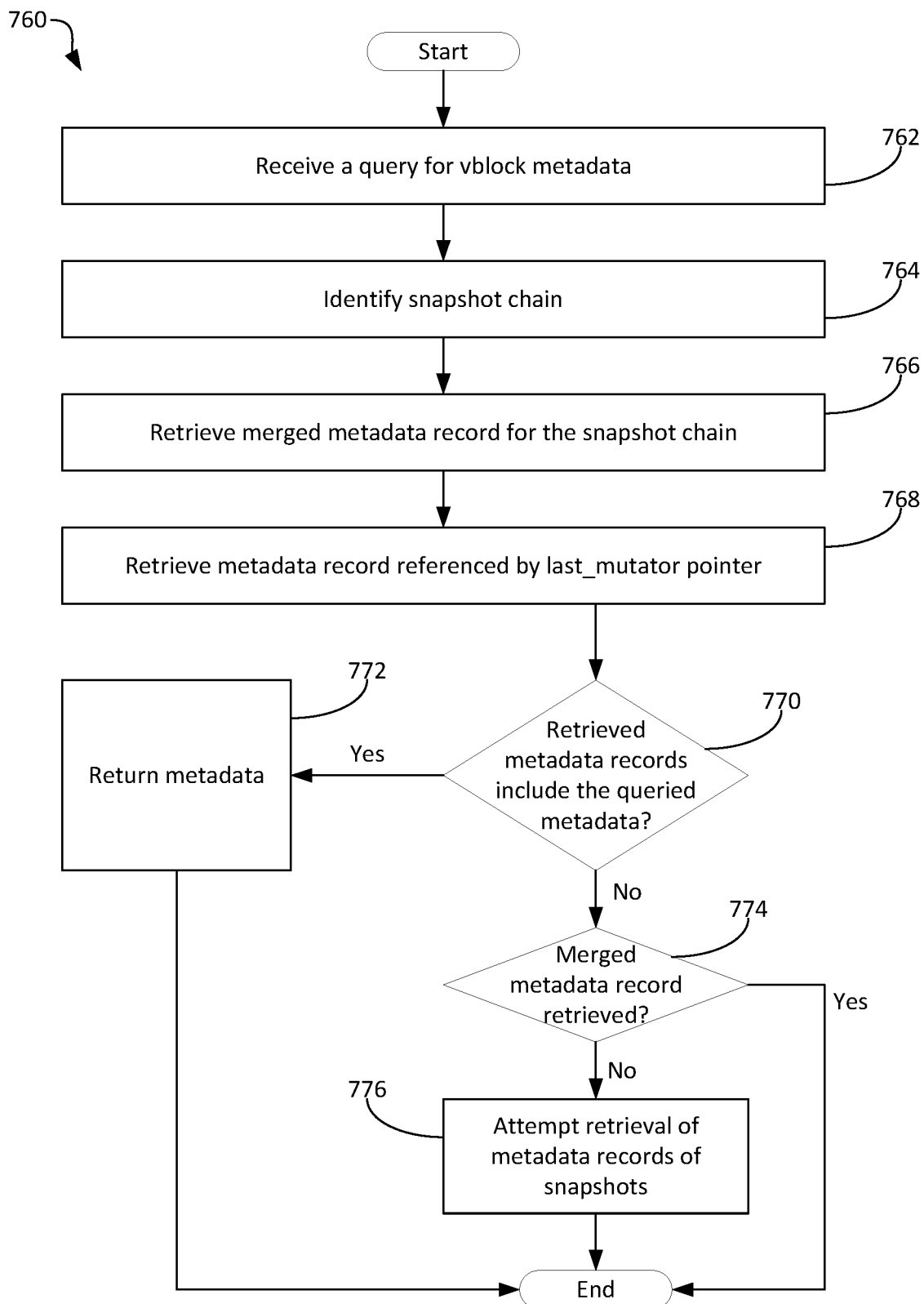
FIG. 8 is a flow diagram of method steps for performing a read operation using a merged metadata record, according to various embodiments of the present disclosure.

FIG. 8 is a flow diagram of method steps for performing a read operation using a merged metadata record, according to various embodiments of the present disclosure. In some embodiments, the method steps of FIG. 8 may be performed by any computing device or system implementing a virtual disk, such as any of the computing systems disclosed in FIGS. 1A-5 and 9A-10 disclosed herein.

As shown in FIG. 8, a method 760 begins at a step 762 where a virtual disk manager application 502 receives a query for vblock metadata. For example, a read operation can require access to metadata associated with certain written data, and accordingly, a query or request for that metadata, which can be included in a metadata record, can be made in furtherance of the read operation. In some embodiments, the query request may be a request for metadata associated with certain data required for a read or write request.

At step 764, the virtual disk manager application 502 identifies a chain of snapshots responsive to the query. The virtual disk manager application 502 can, for example, identify the vblock, and a corresponding snapshot chain, that meets the query. For example, for a metadata record request based on a read operation, the virtual disk manager application 502 identifies the vblock and a corresponding snapshot chain associated with the read operation.

At step 766, the virtual disk manager application 502 retrieves the merged metadata record for the snapshot chain.

The virtual disk manager application 502 retrieves the merged metadata record corresponding to the snapshot chain identified in step 764 above. For example, for the snapshot chain illustrated in FIG. 3, the virtual disk manager application 502 would retrieve merged metadata record 220.

At step 768, the virtual disk manager application 502 retrieves the metadata record referenced by a last_mutator pointer for the vblock. The virtual disk manager application 502 identifies the snapshot and corresponding metadata record pointed to by the last_mutator pointer and retrieves that metadata record. For example, for the snapshot chain illustrated in FIG. 3, the virtual disk manager application 502 would retrieve metadata record 252-5.

At step 770, the virtual disk manager application 502 determines whether the retrieved last_mutator metadata record or the retrieved merged metadata record includes the queried metadata. If the retrieved last_mutator metadata record or the retrieved merged metadata record includes the metadata responsive to the query, then method 760 proceeds (770—Yes) to step 772, where the virtual disk manager application 502 returns the metadata 160 responsive to the query. In some embodiments, the virtual disk manager application 502 can retrieve the metadata responsive to the query from the last_mutator metadata record or merged metadata record and return the metadata. Then method 760 ends.

If the retrieved metadata record and the retrieved merged metadata record do not include the queried metadata (e.g., the retrieved last_mutator metadata record and merged metadata record are null, there is no merged metadata record and no last_mutator metadata record, the merged metadata record and the last_mutator metadata record do not include the metadata responsive to the query) then method 760 proceeds to step 774. At step 774, if a merged metadata record was successfully retrieved in step 766, then method 760 ends (774—Yes); the merged metadata record already included the accumulation of metadata from metadata records up to the snapshot pointed to by the merged_upto pointer. If a merged metadata record was retrieved and neither the merged metadata record nor the last_mutator metadata record includes the queried metadata, then virtual disk manager application 502 can determine that the requested metadata cannot be found. The virtual disk manager application 502 can return a message or other information indicating that the data is not found in for the vblock location (e.g., an offset range) specified in the request (e.g., return zeroes), in accordance with the failure to retrieve a metadata record or merged metadata record that satisfies the request.

If a merged metadata record was not successfully retrieved in step 766, then method 760 proceeds (774-No) to step 776, where the virtual disk manager application 502 attempts to retrieve metadata records of snapshots, following one or more steps of method 600. For example, the virtual disk manager application 502 can performs steps 606-612 of method 600 to attempt retrieval of one or more metadata records up through the identified snapshot chain and determine whether any of those metadata records includes the queried metadata.

In embodiments that include clone chains of vblocks, performance of a read operation using a merged metadata record can include a combination of steps similar to those of methods 600 and 760. First, the virtual disk manager application 502 can follow the steps of method 760 to retrieve a merged metadata record for the clone chain (e.g., c1-c2 in FIG. 4A-4D) and a metadata record referenced by a last_mutator pointer in that merged metadata record. If there is no merged metadata record (e.g., because no data has been written to the clone chain yet and accordingly no such merged metadata record has been generated), then the virtual disk manager application 502 can proceed to follow the steps of method 760 to retrieve metadata records for the parent chain to the clone chain (e.g., v1-v4 in FIGS. 4A-4D). The virtual disk manager application 502 can recursively follow these steps for further parent chains. If the parent chain has a merged metadata record whose merged_upto and last_mutator pointers do not refer to a metadata record more recent than the portion of the parent chain referenced by the clone chain, then the metadata for the parent chain can be used to complete the query If the parent chain has a merged metadata record whose merged_upto or last_mutator pointer refers to a metadata record more recent than the portion of the parent chain referenced by the clone chain (e.g., pointer 470 or 472 in FIG. 4D), then the virtual disk manager application 502 can follow the steps of method 600 with respect to the portion of the parent chain referenced by the clone chain.

Exemplary Virtualization System Architectures

According to some embodiments, all or portions of any of the foregoing techniques described with respect to FIGS. 1A-8 can be partitioned into one or more modules and instanced within, or as, or in conjunction with a virtualized controller in a virtual computing environment. Some example instances within various virtual computing environments are shown and discussed in further detail in FIGS. 9A-9D. Consistent with these embodiments, a virtualized controller includes a collection of software instructions that serve to abstract details of underlying hardware or software components from one or more higher-level processing entities. In some embodiments, a virtualized controller can be implemented as a virtual machine, as an executable container, or within a layer (e.g., such as a layer in a hypervisor). Consistent with these embodiments, distributed systems include collections of interconnected components that are designed for, or dedicated to, storage operations as well as being designed for, or dedicated to, computing and/or networking operations.

In some embodiments, interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

In some embodiments, a hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

In some embodiments, physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

Figure 9A:
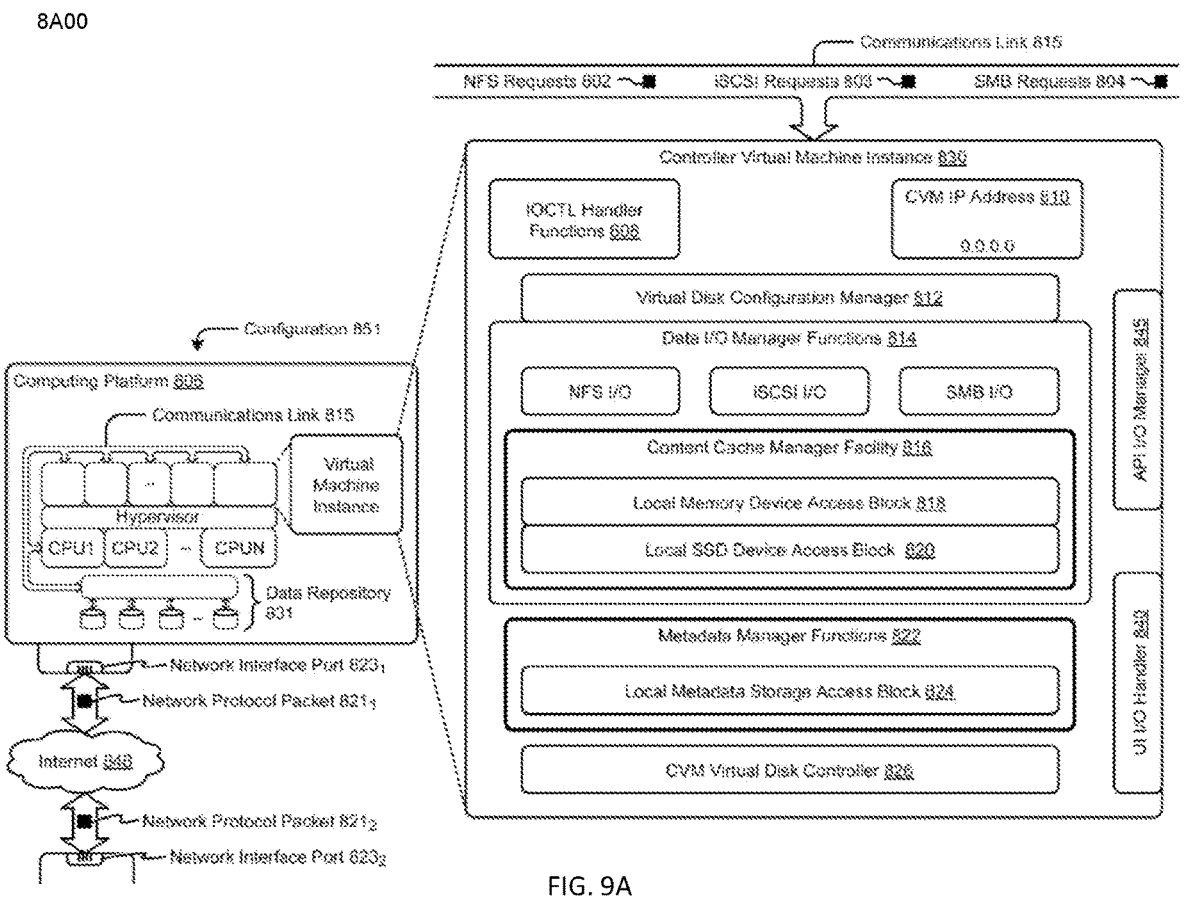
FIGS. 9A-9D are block diagrams illustrating virtualization system architectures configured to implement one or more aspects of the present embodiments.

FIG. 9A is a block diagram illustrating virtualization system architecture 8A00 configured to implement one or more aspects of the present embodiments. As shown in FIG. 9A, virtualization system architecture 8A00 includes a collection of interconnected components, including a controller virtual machine (CVM) instance 830 in a configuration 851. Configuration 851 includes a computing platform 806 that supports virtual machine instances that are deployed as user virtual machines, or controller virtual machines or both. Such virtual machines interface with a hypervisor (as shown). In some examples, virtual machines may include processing of storage I/O (input/output or IO) as received from any or every source within the computing platform. An example implementation of such a virtual machine that processes storage I/O is depicted as CVM instance 830.

In this and other configurations, a CVM instance receives block I/O storage requests as network file system (NFS) requests in the form of NFS requests 802, internet small computer storage interface (iSCSI) block IO requests in the form of iSCSI requests 803, Samba file system (SMB) requests in the form of SMB requests 804, and/or the like. The CVM instance publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 806 include one or more computer readable media that is capable of providing instructions to a data processor for execution. In some examples, each of the computer readable media may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory (RANI). As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet 821$_1$ and network protocol packet 821$_2$).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 9B:
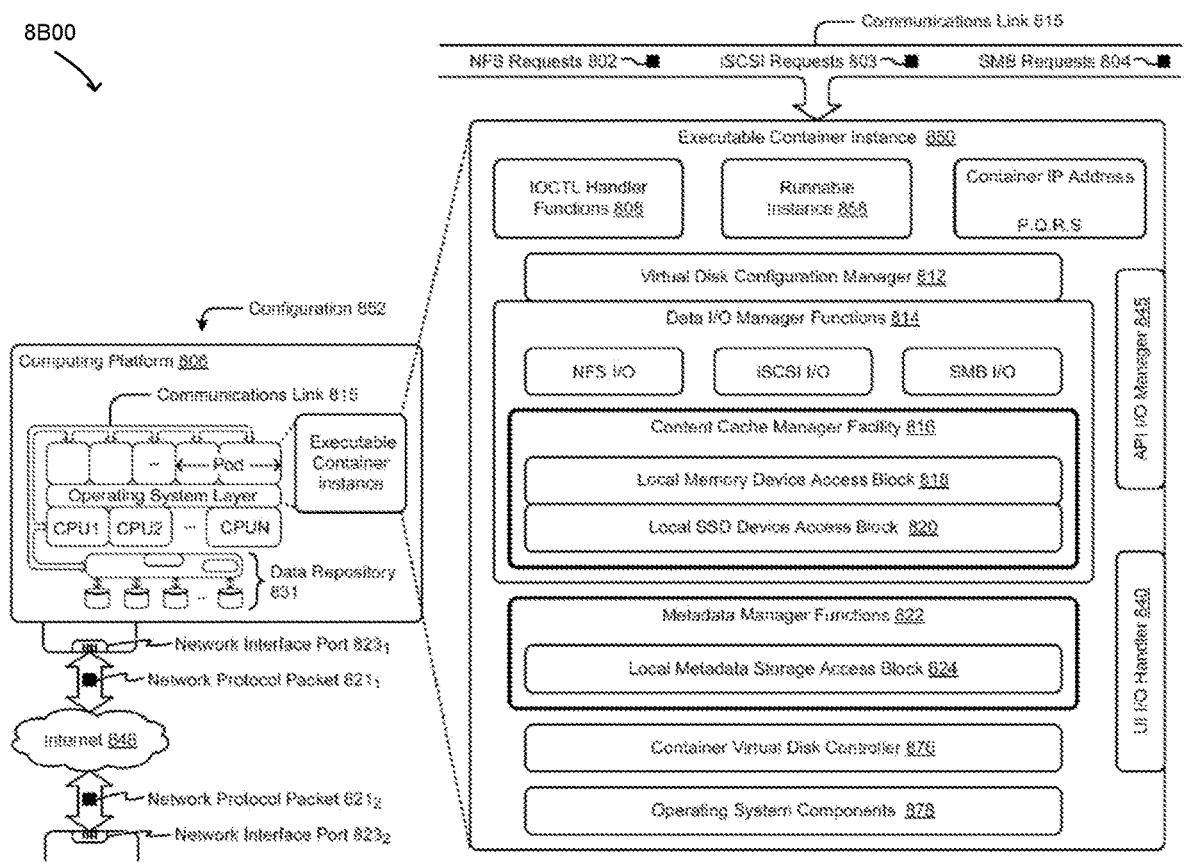

FIG. 9B depicts a block diagram illustrating another virtualization system architecture 8B00 configured to implement one or more aspects of the present embodiments. As shown in FIG. 9B, virtualization system architecture 8B00 includes a collection of interconnected components, including an executable container instance 850 in a configuration 852. Configuration 852 includes a computing platform 806 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
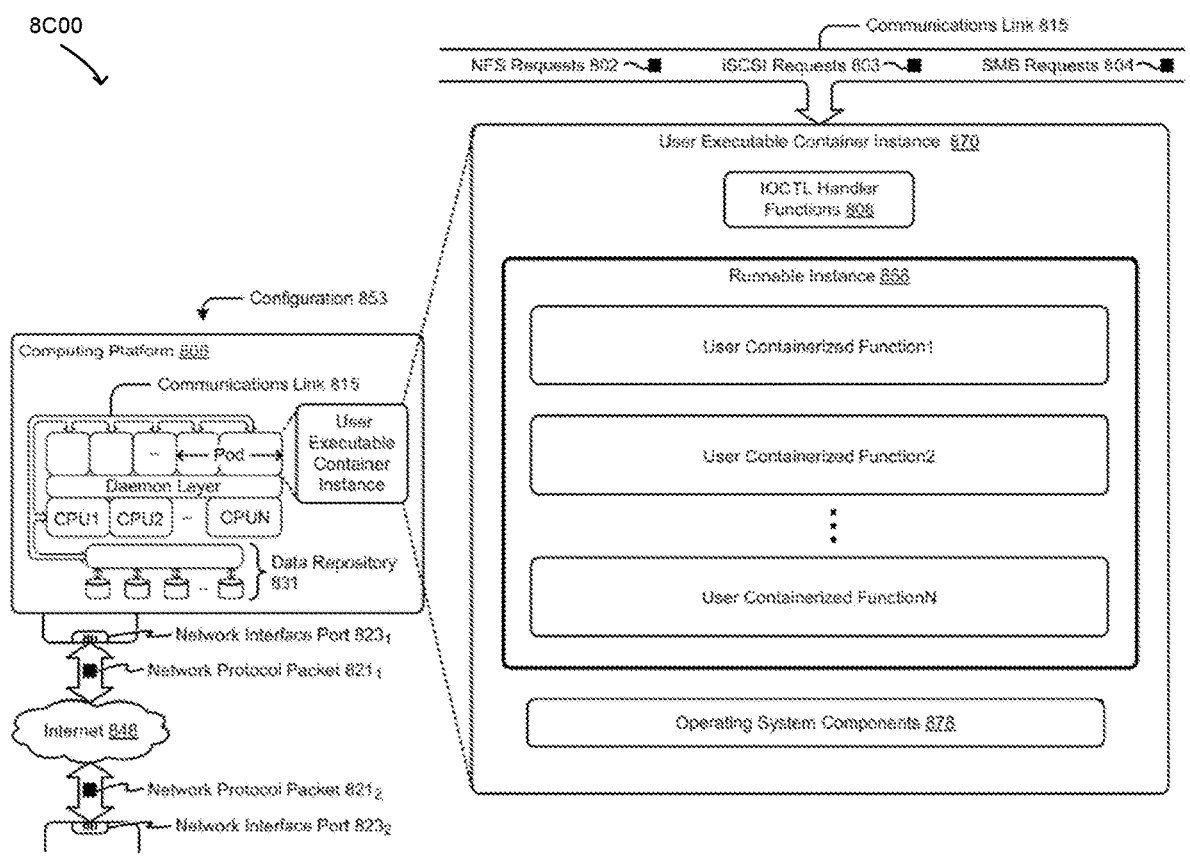

FIG. 9C is a block diagram illustrating virtualization system architecture 8C00 configured to implement one or more aspects of the present embodiments. As shown in FIG. 9C, virtualization system architecture 8C00 includes a collection of interconnected components, including a user executable container instance in configuration 853 that is further described as pertaining to user executable container instance 870. Configuration 853 includes a daemon layer (as shown) that performs certain functions of an operating system.

User executable container instance 870 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In some embodiments of a daemon-assisted containerized architecture, computing platform 806 might or might not host operating system components other than operating system components 878. More specifically, the shown daemon might or might not host operating system components other than operating system components 878 of user executable container instance 870.

In some embodiments, the virtualization system architecture 8A00, 8B00, and/or 8C00 can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiments, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 851) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 9D:
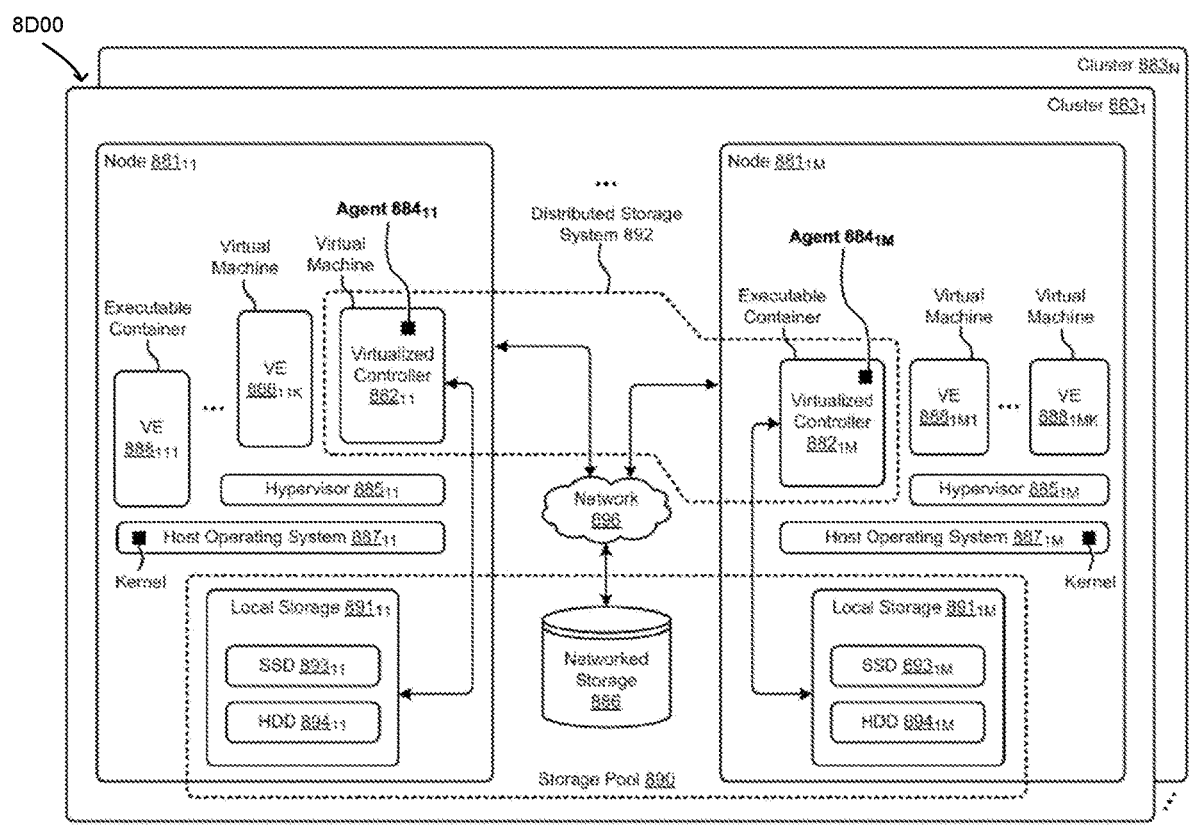

FIG. 9D is a block diagram illustrating virtualization system architecture 8D00 configured to implement one or more aspects of the present embodiments. As shown in FIG. 9D, virtualization system architecture 8D00 includes a distributed virtualization system that includes multiple clusters (e.g., cluster $883_1$, . . . , cluster $883_N$) comprising multiple nodes that have multiple tiers of storage in a storage pool. Representative nodes (e.g., node $881_{11}$, . . . , node $881_{1M}$) and storage pool 890 associated with cluster $883_1$ are shown. Each node can be associated with one server, multiple servers, or portions of a server. The nodes can be associated (e.g., logically and/or physically) with the clusters. As shown, the multiple tiers of storage include storage that is accessible through a network 896, such as a networked storage 886 (e.g., a storage area network or SAN, network attached storage or NAS, etc.). The multiple tiers of storage further include instances of local storage (e.g., local storage $891_{11}$, . . . , local storage $891_{1M}$). For example, the local storage can be within or directly attached to a server and/or appliance associated with the nodes. Such local storage can include solid state drives (SSD $893_{11}$, . . . , SSD $893_{1M}$), hard disk drives (HDD $894_{11}$, . . . , HDD $894_{1M}$), and/or other storage devices.

As shown, any of the nodes of the distributed virtualization system can implement one or more user virtualized entities (e.g., VE $888_{111}$, . . . , VE $888_{11K}$, . . . , VE $888_{1M1}$, . . . , VE $888_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $887_{11}$, . . . , host operating system $887_{1M}$), while the VMs run multiple applications on various respective guest operating systems. Such flexibility can be facilitated at least in part by a hypervisor (e.g., hypervisor $885_{11}$, . . . , hypervisor $885_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system $887_{11}$, . . . , host operating system $887_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 890 by the VMs and/or the executable containers.

Multiple instances of such virtualized controllers can coordinate within a cluster to form the distributed storage system 892 which can, among other operations, manage the storage pool 890. This architecture further facilitates efficient scaling in multiple dimensions (e.g., in a dimension of computing power, in a dimension of storage space, in a dimension of network bandwidth, etc.).

In some embodiments, a particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $881_{11}$ can interface with a controller virtual machine (e.g., virtualized controller $882_{11}$) through hypervisor $885_{11}$ to access data of storage pool 890. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 892. For example, a hypervisor at one node in the distributed storage system 892 might correspond to software from a first vendor, and a hypervisor at another node in the distributed storage system 892 might correspond to a second software vendor. As another virtualized controller implementation example, executable containers can be used to implement a virtualized controller (e.g., virtualized controller $882_{1M}$) in an operating system virtualization environment at a given node. In this case, for example, the virtualized entities at node $881_{1M}$ can access the storage pool 890 by interfacing with a controller container (e.g., virtualized controller $882_{1M}$) through hypervisor $885_{1M}$ and/or the kernel of host operating system $887_{1M}$.

In some embodiments, one or more instances of an agent can be implemented in the distributed storage system 892 to facilitate the herein disclosed techniques. Specifically, agent $884_{11}$ can be implemented in the virtualized controller $882_{11}$, and agent $884_{1M}$ can be implemented in the virtualized controller $882_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Exemplary Computer System

Figure 10:
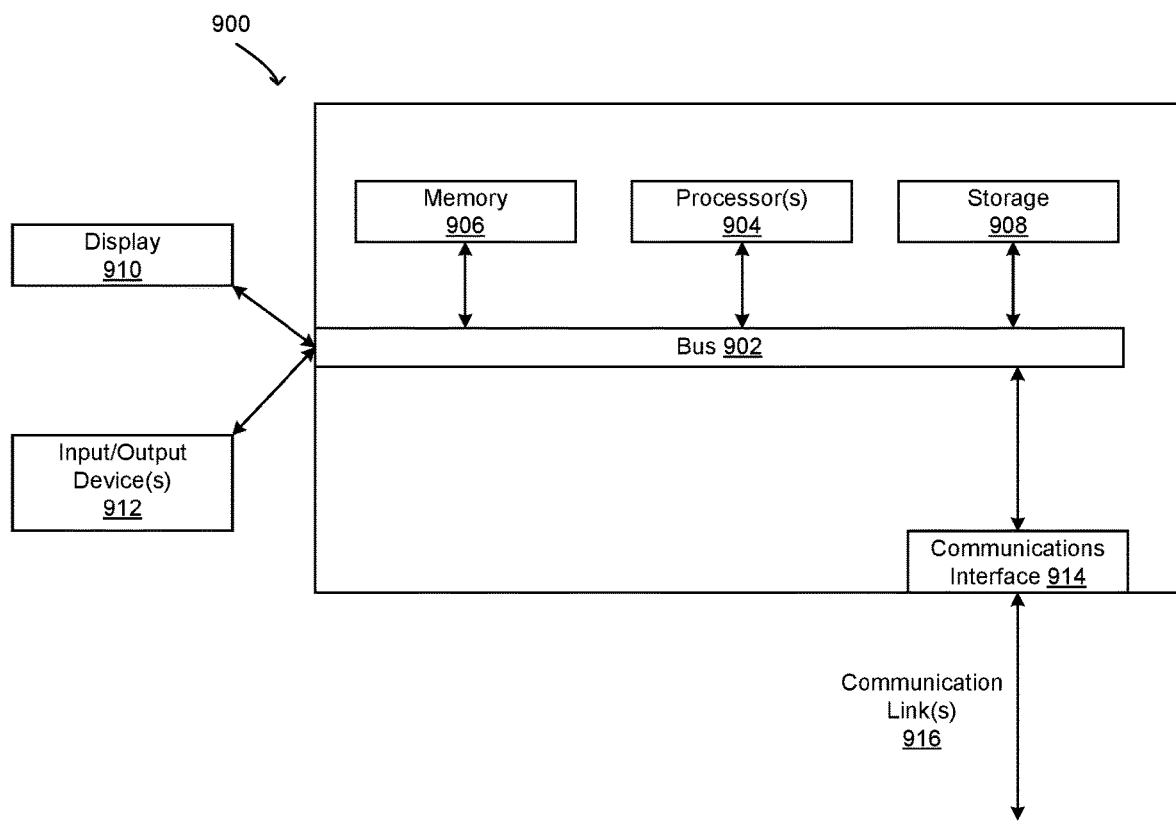
FIG. 10 is a block diagram illustrating a computer system configured to implement one or more aspects of the present embodiments.

FIG. 10 is a block diagram illustrating a computer system 900 configured to implement one or more aspects of the present embodiments. In some embodiments, computer system 900 may be representative of a computer system for implementing one or more aspects of the embodiments disclosed in FIGS. 1A-9D. In some embodiments, computer system 900 is a server machine operating in a data center or a cloud computing environment. suitable for implementing an embodiment of the present disclosure. As shown, computer system 900 includes a bus 902 or other communication mechanism for communicating information, which interconnects subsystems and devices, such as one or more processors 904, memory 906, storage 908, optional display 910, one or more input/output devices 912, and a communications interface 914. Computer system 900 described herein is illustrative and any other technically feasible configurations fall within the scope of the present disclosure.

The one or more processors 904 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, the one or more processors 904 may be any technically feasible hardware unit capable of processing data and/or executing software applications. Further, in the context of this disclosure, the computing elements shown in computer system 900 may correspond to a physical computing system (e.g., a system in a data center) or may be a virtual computing instance, such as any of the virtual machines described in FIGS. 9A-9D.

Memory 906 includes a random access memory (RAM) module, a flash memory unit, and/or any other type of memory unit or combination thereof. The one or more processors 904, and/or communications interface 914 are configured to read data from and write data to memory 906. Memory 906 includes various software programs that include one or more instructions that can be executed by the one or more processors 904 and application data associated with said software programs.

Storage 908 includes non-volatile storage for applications and data, and may include one or more fixed or removable disk drives, HDDs, SSD, NVMes, vDisks, flash memory devices, and/or other magnetic, optical, and/or solid state storage devices.

Communications interface 914 includes hardware and/or software for coupling computer system 900 to one or more communication links 915. The one or more communication links 915 may include any technically feasible type of communications network that allows data to be exchanged between computer system 900 and external entities or devices, such as a web server or another networked computing system. For example, the one or more communication links 915 may include one or more wide area networks (WANs), one or more local area networks (LANs), one or more wireless (WiFi) networks, the Internet, and/or the like.

In sum, a storage system that includes a vdisk can implement a merged metadata record for managing metadata associated with the vdisk. The merged metadata record includes cumulative metadata associated with data written to the vblock over one or more vblock snapshots, up to a certain snapshot prior to the live vblock or snapshot, which was last written to. The merged metadata record includes a first pointer referencing a snapshot up to which the merged metadata record has metadata, and a second pointer referencing the most recent snapshot in which data was written, which may be the live vblock. Metadata for data written to the vblock can be accessed by querying the merged metadata record and the metadata record for the most recent snapshot or the live vblock to which the second pointer references.

At least one technical advantage of the disclosed techniques relative to the prior art is that the disclosed techniques can manage and access the metadata records for a vblock or a chain of vdisks using fewer queries than previous approaches. Accordingly, operations that require access to metadata records have reduced latency compared to previous approaches. Further, such operations consume less processing resources compared to previous approaches, which reduces the load on computers (e.g., servers) that store and/or serve metadata records. These technical advantages provide one or more technological advancements over prior art approaches.

1. In some embodiments, one or more non-transitory computer-readable media store program instructions that, when executed by one or more processors, cause the one or more processors to perform steps of receiving a request for metadata associated with a vblock; accessing a merged metadata record associated with the vblock, wherein the merged metadata record comprises metadata corresponding to metadata in metadata records for all but a last snapshot or a live vblock having a metadata record, and a first identifier of the last snapshot or the live vblock having a metadata record; and returning the requested metadata based on the metadata in the merged metadata record and metadata in the metadata record identified by the first identifier.

2. The one or more non-transitory computer-readable media of clause 1, wherein the merged metadata record is keyed by one or more of an identifier of the vblock or an identifier of a vdisk chain corresponding to the vblock.

3. The one or more non-transitory computer-readable media of clauses 1 or 2, wherein a metadata record for the last snapshot or the live vblock is keyed by one or more of an identifier of the last snapshot, an identifier of the vblock, or an identifier of a vdisk chain corresponding to the vblock.

4. The one or more non-transitory computer-readable media of any of clauses 1-3, wherein the steps further comprise, when the merged metadata record is not found, requesting metadata records for one or more snapshots of the vblock.

5. The one or more non-transitory computer-readable media of any of clauses 1-4, wherein the steps further comprise, when the merged metadata record is not found, retrieving a merged metadata record corresponding to a parent chain snapshots.

6. The one or more non-transitory computer-readable media of any of clauses 1-5, wherein the merged metadata record further comprises a second identifier of a next to most recent snapshot having a metadata record whose metadata is included in the metadata of the merged metadata record.

7. The one or more non-transitory computer-readable media of any of clauses 1-6, wherein returning the requested metadata based on the metadata in the merged metadata record and metadata in the metadata record identified by the first identifier comprises retrieving the requested metadata from the merged metadata record.

8. The one or more non-transitory computer-readable media of any of clauses 1-7, wherein returning the requested metadata based on the metadata in the merged metadata record and metadata in the metadata record identified by the first identifier comprises retrieving the requested metadata from the metadata record identified by the first identifier.

9. In some embodiments, a method for accessing metadata associated with a vblock comprises receiving a request for metadata associated with a vblock; accessing a merged metadata record associated with the vblock, wherein the merged metadata record comprises metadata corresponding to metadata in metadata records for all but a last snapshot or a live vblock having a metadata record, and a first identifier of the last snapshot or the live vblock having a metadata record; and returning the requested metadata based on the metadata in the merged metadata record and metadata in the metadata record identified by the first identifier.

10. The method of clause 9, wherein the merged metadata record is keyed by one or more of an identifier of the vblock or an identifier of a vdisk chain corresponding to the vblock.

11. The method of clauses 9 or 10, wherein a metadata record for the last snapshot or the live vblock is keyed by one or more of an identifier of the last snapshot, an identifier of the vblock, or an identifier of a vdisk chain corresponding to the vblock.

12. The method of any of clauses 9-11, further comprising, when the merged metadata record is not found, requesting metadata records for one or more snapshots of the vblock.

13. The method of any of clauses 9-12, further comprising, when the merged metadata record is not found, retrieving a merged metadata record corresponding to a parent chain of snapshots.

14. The method of any of clauses 9-13, wherein the merged metadata record further comprises a second identifier of a next to most recent snapshot having a metadata record whose metadata is included in the metadata of the merged metadata record.

15. The method of any of clauses 9-14, wherein returning the requested metadata based on the metadata in the merged metadata record and metadata in the metadata record identified by the first identifier comprises retrieving the requested metadata from the merged metadata record.

16. The method of any of clauses 9-15, wherein returning the requested metadata based on the metadata in the merged metadata record and metadata in the metadata record identified by the first identifier comprises retrieving the requested metadata from the metadata record identified by the first identifier.

17. In some embodiments, a system comprises a memory storing a set of instructions; and one or more processors that, when executing the set of instructions, are configured to receive a request for metadata associated with a vblock; access a merged metadata record associated with the vblock, wherein the merged metadata record comprises metadata corresponding to metadata in metadata records for all but a last snapshot or a live vblock having a metadata record, and a first identifier of the last snapshot or the live vblock having a metadata record; and return the requested metadata based on the metadata in the merged metadata record and metadata in the metadata record identified by the first identifier.

18. The system of clause 17, wherein the merged metadata record is keyed by one or more of an identifier of the vblock or an identifier of a vdisk chain corresponding to the vblock.

19. The system of clauses 17 or 18, wherein a metadata record for the last snapshot or the live vblock is keyed by one or more of an identifier of the last snapshot, an identifier of the vblock, or an identifier of a vdisk chain corresponding to the vblock.

20. The system of any of clauses 17-19, wherein the one or more processors, when executing the set of instructions, are further configured to, when the merged metadata record is not found, request metadata records for one or more snapshots of the vblock.

21. The system of any of clauses 17-20, wherein the one or more processors, when executing the set of instructions, are further configured to, when the merged metadata record is not found, retrieving a merged metadata record corresponding to a parent chain of snapshots.

22. The system of any of clauses 17-21, wherein the merged metadata record further comprises a second identifier of a next to most recent snapshot having a metadata record whose metadata is included in the metadata of the merged metadata record.

23. The system of any of clauses 17-22, wherein returning the requested metadata based on the metadata in the merged metadata record and metadata in the metadata record identified by the first identifier comprises retrieving the requested metadata from the merged metadata record.

24. The system of any of clauses 17-23, wherein returning the requested metadata based on the metadata in the merged metadata record and metadata in the metadata record identified by the first identifier comprises retrieving the requested metadata from the metadata record identified by the first identifier.

25. In some embodiments, one or more non-transitory computer-readable media store program instructions that, when executed by one or more processors, cause the one or more processors to perform steps of receiving a request to write data to a live vblock, wherein the request to write data is a first write request for the live vblock; accessing a merged metadata record associated with the live vblock, wherein the merged metadata record comprises metadata corresponding to metadata in metadata records for all but a last snapshot included in a set of snapshots having a metadata record; adding metadata associated with the request to write data to a metadata record for the live vblock; merging a metadata record for the last snapshot into the merged metadata record; and updating a first identifier of the merged metadata record to identify the live vblock.

26. The one or more non-transitory computer-readable media of clause 25, wherein the steps further comprise creating the metadata record for the live vblock.

27. The one or more non-transitory computer-readable media of clauses 25 or 26, wherein the steps further comprise updating a second identifier of the merged metadata record to identify the last snapshot.

28. The one or more non-transitory computer-readable media of any of clauses 25-27, wherein, prior to the updating the first identifier, the first identifier identifies the last snapshot.

29. The one or more non-transitory computer-readable media of any of clauses 25-28, wherein the live vblock is associated with a first set of snapshots, and the last snapshot is included in a parent set of snapshots referenced by the first set of snapshots.

30. The one or more non-transitory computer-readable media of any of clauses 25-29, wherein the steps further comprise receiving a second request to write data to the live vblock; and adding metadata associated with the second request to write data to the metadata record for the live vblock without modifying the merged metadata record and the first identifier.

31. In some embodiments, a method for processing a write request comprises receiving a request to write data to a live vblock, wherein the request to write data is a first write request for the live vblock; accessing a merged metadata record associated with the live vblock, wherein the merged metadata record comprises metadata corresponding to metadata in metadata records for all but a last snapshot included in a set of snapshots having a metadata record; adding metadata associated with the request to write data to a metadata record for the live vblock; merging a metadata record for the last snapshot into the merged metadata record; and updating a first identifier of the merged metadata record to identify the live vblock.

32. The method of clause 31, further comprising creating the metadata record for the live vblock.

33. The method of clauses 31 or 32, further comprising updating a second identifier of the merged metadata record to identify the last snapshot.

34. The method of any of clauses 31-33, wherein, prior to the updating the first identifier, the first identifier identifies the last snapshot.

35. The method of any of clauses 31-34, wherein the live vblock is associated with a first set of snapshots, and the last snapshot is included in a parent set of snapshots referenced by the first set of snapshots.

36. The method of any of clauses 31-35, further comprising receiving a second request to write data to the live vblock; and adding metadata associated with the second request to write data to the metadata record for the live vblock without modifying the merged metadata record and the first identifier.

37. In some embodiments, a system comprises a memory storing a set of instructions; and one or more processors that, when executing the set of instructions, are configured to receive a request to write data to a live vblock, wherein the request to write data is a first write request for the live vblock; access a merged metadata record associated with the live vblock, wherein the merged metadata record comprises metadata corresponding to metadata in metadata records for all but a last snapshot included in a set of snapshots having a metadata record; add metadata associated with the request to write data to a metadata record for the live vblock; merge a metadata record for the last snapshot into the merged metadata record; and update a first identifier of the merged metadata record to identify the live vblock.

38. The system of clause 37, wherein the one or more processors, when executing the set of instructions, are further configured to create the metadata record for the live vblock.

39. The system of clauses 37 or 38, wherein the one or more processors, when executing the set of instructions, are further configured to update a second identifier associated with the merged metadata record to identify the last snapshot.

40. The system of any of clauses 37-39, wherein, prior to updating the first identifier, the first identifier identifies the last snapshot.

41. The system of any of clauses 37-40, wherein the live vblock is associated with a first set of snapshots, and the last snapshot is included in a parent set of snapshots referenced by the first set of snapshots.

42. The system of any of clauses 37-41, wherein the one or more processors, when executing the set of instructions, are further configured to receive a second request to write data to the live vblock; and add metadata associated with the second request to write data to the metadata record for the live vblock without modifying the merged metadata record and the first identifier.

43. In some embodiments, a method for managing metadata for a vblock comprises managing a metadata record for each snapshot of the vblock that has been written to; and managing a merged metadata record, the merged metadata record comprising metadata corresponding to the metadata in the metadata records for all but a last snapshot or a live vblock having a metadata record, a first identifier of a next to last snapshot having a metadata record, and a second identifier of the last snapshot or the live vblock having a metadata record.

44. The method of clause 43, further comprising, in response to receiving a read operation for the vblock, accessing the merged metadata record; and accessing the metadata record corresponding to the second identifier.

45. The method of clauses 43 or 44, further comprising, in response to receiving a first write operation for the live vblock, updating the merged metadata record to include the metadata in the metadata record for the snapshot identified by the second identifier; setting the first identifier to the second identifier; and setting the second identifier to an identifier of the live vblock.

46. The method of any of clauses 43-45, wherein the merged metadata record is keyed by one or more of an identifier of the vblock or an identifier of a vdisk chain corresponding to the vblock.

47. The method of any of clauses 43-46, wherein the metadata record for a snapshot is keyed by one or more of an identifier of the snapshot, an identifier of the vblock, or an identifier of a vdisk chain corresponding to the vblock.

48. The method of any of clauses 43-47, wherein a first metadata in the merged metadata record comprises a reference to a location in a physical storage device.

49. In some embodiments, one or more non-transitory computer-readable media store program instructions that, when executed by one or more processors, cause the one or more processors to perform steps of managing a metadata record for each snapshot of a vblock that has been written to; and managing a merged metadata record, the merged metadata record comprising metadata corresponding to the metadata in the metadata records for all but a last snapshot or a live vblock having a metadata record, a first identifier of a next to last snapshot having a metadata record, and a second identifier of the last snapshot or the live vblock having a metadata record.

50. The one or more non-transitory computer-readable media of clause 49, wherein the steps further comprise, in response to receiving a read operation for the vblock, accessing the merged metadata record; and accessing the metadata record corresponding to the second identifier.

51. The one or more non-transitory computer-readable media of clauses 49 or 50, wherein the steps further comprise, in response to receiving a first write operation for the live vblock, updating the merged metadata record to include the metadata in the metadata record for the snapshot identified by the second identifier; setting the first identifier to the second identifier; and setting the second identifier to an identifier of the live vblock.

52. The one or more non-transitory computer-readable media of any of clauses 49-51, wherein the merged metadata record is keyed by one or more of an identifier of the vblock or an identifier of a vdisk chain corresponding to the vblock.

53. The one or more non-transitory computer-readable media of any of clauses 49-52, wherein the metadata record for a snapshot is keyed by one or more of an identifier of the snapshot, an identifier of the vblock, or an identifier of a vdisk chain corresponding to the vblock.

54. The one or more non-transitory computer-readable media of any of clauses 49-53, wherein a first metadata in the merged metadata record comprises a reference to a location in a physical storage device.

55. In some embodiments, a system comprises a memory storing a set of instructions; and one or more processors that, when executing the set of instructions, are configured to manage a metadata record for each snapshot of a vblock that has been written to; and manage a merged metadata record, the merged metadata record comprising metadata corresponding to the metadata in the metadata records for all but a last snapshot or a live vblock having a metadata record, a first identifier of a next to last snapshot having a metadata record, and a second identifier of the last snapshot or the live vblock having a metadata record.

56. The system of clause 55, wherein the one or more processors, when executing the set of instructions, are further configured to, in response to receiving a read operation for the vblock, access the merged metadata record; and access the metadata record corresponding to the second identifier.

57. The system of clauses 55 or 56, wherein the one or more processors, when executing the set of instructions, are further configured to, in response to receiving a first write operation for the live vblock, update the merged metadata record to include the metadata in the metadata record for the snapshot identified by the second identifier; set the first identifier to the second identifier; and set the second identifier to an identifier of the live vblock.

58. The system of any of clauses 55-57, wherein the merged metadata record is keyed by one or more of an identifier of the vblock or an identifier of a vdisk chain corresponding to the vblock.

59. The system of any of clauses 55-58, wherein the metadata record for a snapshot is keyed by one or more of an identifier of the snapshot, an identifier of the vblock, or an identifier of a vdisk chain corresponding to the vblock.

60. The system of any of clauses 55-59, wherein a first metadata in the merged metadata record comprises a reference to a location in a physical storage device.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RANI), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable media storing program instructions that, when executed by one or more processors, cause the one or more processors to perform steps of:
receiving a request to write data to a live vblock, wherein the request to write data is a first write request for the live vblock;
accessing a merged metadata record associated with the live vblock, wherein the merged metadata record comprises metadata corresponding to metadata in metadata records for all but a most recent snapshot included in a set of snapshots having a metadata record;
adding metadata associated with the request to write data to a metadata record for the live vblock;
merging a metadata record for the most recent snapshot into the merged metadata record; and
updating a first identifier of the merged metadata record to identify the live vblock.

2. The one or more non-transitory computer-readable media of claim 1, wherein the steps further comprise creating the metadata record for the live vblock.

3. The one or more non-transitory computer-readable media of claim 1, wherein the steps further comprise updating a second identifier of the merged metadata record to identify the most recent snapshot.

4. The one or more non-transitory computer-readable media of claim 1, wherein, prior to the updating the first identifier, the first identifier identifies the most recent snapshot.

5. The one or more non-transitory computer-readable media of claim 1, wherein the live vblock is associated with a first set of snapshots, and the most recent snapshot is included in a parent set of snapshots referenced by the first set of snapshots.

6. The one or more non-transitory computer-readable media of claim 1, wherein the steps further comprise:
receiving a second request to write data to the live vblock; and
adding metadata associated with the second request to write data to the metadata record for the live vblock without modifying the merged metadata record and the first identifier.

7. A method for processing a write request, comprising:
receiving a request to write data to a live vblock, wherein the request to write data is a first write request for the live vblock;
accessing a merged metadata record associated with the live vblock, wherein the merged metadata record comprises metadata corresponding to metadata in metadata records for all but a most recent snapshot included in a set of snapshots having a metadata record;
adding metadata associated with the request to write data to a metadata record for the live vblock;
merging a metadata record for the most recent snapshot into the merged metadata record; and
updating a first identifier of the merged metadata record to identify the live vblock.

8. The method of claim 7, further comprising creating the metadata record for the live vblock.

9. The method of claim 7, further comprising updating a second identifier of the merged metadata record to identify the most recent snapshot.

10. The method of claim 7, wherein, prior to the updating the first identifier, the first identifier identifies the most recent snapshot.

11. The method of claim 7, wherein the live vblock is associated with a first set of snapshots, and the most recent snapshot is included in a parent set of snapshots referenced by the first set of snapshots.

12. The method of claim 7, further comprising:
receiving a second request to write data to the live vblock; and
adding metadata associated with the second request to write data to the metadata record for the live vblock without modifying the merged metadata record and the first identifier.

13. A system, comprising:
a memory storing a set of instructions; and
one or more processors that, when executing the set of instructions, are configured to:
receive a request to write data to a live vblock, wherein the request to write data is a first write request for the live vblock;
access a merged metadata record associated with the live vblock, wherein the merged metadata record comprises metadata corresponding to metadata in metadata records for all but a most recent snapshot included in a set of snapshots having a metadata record;
add metadata associated with the request to write data to a metadata record for the live vblock;
merge a metadata record for the most recent snapshot into the merged metadata record; and
update a first identifier of the merged metadata record to identify the live vblock.

14. The system of claim 13, wherein the one or more processors, when executing the set of instructions, are further configured to create the metadata record for the live vblock.

15. The system of claim 13, wherein the one or more processors, when executing the set of instructions, are further configured to update a second identifier associated with the merged metadata record to identify the most recent snapshot.

16. The system of claim 13, wherein, prior to updating the first identifier, the first identifier identifies the most recent snapshot.

17. The system of claim 13, wherein the live vblock is associated with a first set of snapshots, and the most recent snapshot is included in a parent set of snapshots referenced by the first set of snapshots.

18. The system of claim 13, wherein the one or more processors, when executing the set of instructions, are further configured to:
receive a second request to write data to the live vblock; and
add metadata associated with the second request to write data to the metadata record for the live vblock without modifying the merged metadata record and the first identifier.

19. One or more non-transitory computer-readable media storing program instructions that, when executed by one or more processors, cause the one or more processors to perform steps of:
managing a metadata record for each snapshot of a vblock that has been written to; and
managing a merged metadata record, the merged metadata record comprising:
metadata corresponding to the metadata in the metadata records for all but a most recent snapshot or a live vblock having a metadata record, a first identifier of a next to most recent snapshot having a metadata record, and a second identifier of the most recent snapshot or the live vblock having a metadata record.

20. The one or more non-transitory computer-readable media of claim 19, wherein the steps further comprise, in response to receiving a read operation for the vblock:

accessing the merged metadata record; and accessing the metadata record corresponding to the second identifier.

21. The one or more non-transitory computer-readable media of claim 19, wherein the steps further comprise, in response to receiving a first write operation for the live vblock:

updating the merged metadata record to include the metadata in the metadata record for the snapshot identified by the second identifier;

setting the first identifier to the second identifier; and setting the second identifier to an identifier of the live vblock.

22. The one or more non-transitory computer-readable media of claim 19, wherein the merged metadata record is keyed by one or more of an identifier of the vblock or an identifier of a vdisk chain corresponding to the vblock.

23. The one or more non-transitory computer-readable media of claim 19, wherein the metadata record for a snapshot is keyed by one or more of an identifier of the snapshot, an identifier of the vblock, or an identifier of a vdisk chain corresponding to the vblock.

24. The one or more non-transitory computer-readable media of claim 19, wherein a first metadata in the merged metadata record comprises a reference to a location in a physical storage device.

* * * * *